United States Patent
Jamoussi et al.

[11] Patent Number: 6,128,280
[45] Date of Patent: Oct. 3, 2000

[54] DYNAMIC CONNECTION BANDWIDTH CONTROL

[75] Inventors: Bilel Nouri Jamoussi, Ottawa; Richard Vallee, Gatineau; Darren Frederick Toop, Ottawa, all of Canada

[73] Assignee: Nortel Networks Corporation, Montreal, Canada

[21] Appl. No.: 08/895,261

[22] Filed: Jul. 16, 1997

[51] Int. Cl.[7] ............................... H04J 1/16; H04J 3/14
[52] U.S. Cl. .......................... 370/230; 370/232; 370/468
[58] Field of Search .................... 370/229, 230, 370/231, 232, 233, 234, 235, 395, 465, 468

[56] References Cited

U.S. PATENT DOCUMENTS

| | | | |
|---|---|---|---|
| 5,351,240 | 9/1994 | Highsmith | 370/468 |
| 5,442,630 | 8/1995 | Gagliardi et al. | 370/468 |
| 5,452,330 | 9/1995 | Goldstein | 375/257 |
| 5,467,348 | 11/1995 | Fujii et al. | |
| 5,491,691 | 2/1996 | Shtayer et al. | |
| 5,574,724 | 11/1996 | Bales et al. | |
| 5,574,861 | 11/1996 | Lorvig et al. | 395/200.06 |
| 5,590,127 | 12/1996 | Bales et al. | 370/260 |
| 5,737,312 | 4/1998 | Sasagawa | 370/232 |
| 5,796,724 | 8/1998 | Rajamani et al. | 370/263 |

*Primary Examiner*—Ajit Patel

[57] ABSTRACT

An apparatus for changing bandwidth loading by a bandwidth change amount in a communications interface having elastic and non-elastic call connections where the elastic and non-elastic call connections have associated current cell rates and equivalent cell rates respectively. The apparatus includes a processor programmed to determine whether the bandwidth change amount is negative or positive. When the bandwidth change amount is negative the processor reduces the current cell rate of each elastic connection and releases at least some non-elastic connections such that the current cell rate of each elastic connection is reduced and the non-elastic connections are released until the total of the current cell rates of the elastic connections and the equivalent cell rates of the non-elastic connections have been reduced by at least the bandwidth change amount. When the bandwidth change amount is positive, the processor increase the current cell rate of each elastic connection and restores non-elastic connections.

108 Claims, 15 Drawing Sheets

CONNECTION TABLE 80

| POINTER | E/D | ATM SVC CAT | BWE | HP | CONN. TYPE | VPI. VCI | ECR | CCR |
|---|---|---|---|---|---|---|---|---|
| A | 0 | CBR | N | 4 | S | 0.32 | 0.2 M | 0 M |
| | | | | | | | | |
| C | 1 | CBR | N | 3 | D | 0.34 | 0.55 M | 0.55 M |
| D | 1 | CBR | N | 3 | S | 0.35 | 0.2 M | 0.2 M |
| E | 1 | CBR | Y | N/A | S | 0.36 | 0.4 M | 0.3 M |
| F | 1 | CBR | Y | N/A | S | 0.37 | 0.2 M | 0.15 M |

Fig. 10a

DYNAMIC CONNECTION BANDWIDTH CONTROL

FIELD OF THE INVENTION

This invention relates to automatic control of dynamic connection bandwidth in communications interfaces and more particularly, to methods and apparatus for reducing, changing and increasing bandwidth loading in a communications interface, and for admitting call connections on a plurality of communications links.

BACKGROUND OF THE INVENTION

Inverse multiplexing for ATM (IMA) is a protocol at the cell level which groups a number of physical links into one higher speed virtual link. IMA interfaces are provided at each end of a link group. In a transmit direction, the cell stream received from the ATM layer is distributed on a cell by cell basis across the multiple links within the link group. At the far end, the receiving IMA recombines the cells from each link on a cell by cell basis, reforming the original cell stream. The re-combined stream is then passed up to the ATM layer and processed in the conventional manner.

However, IMA virtual link bandwidth may fluctuate resulting in a congested state where quality of service (QoS) guarantees (e.g. cell loss ratio) can no longer be met. Hence, a dynamic bandwidth management mechanism would be desirable to ensure that quality of service guarantees are met at all times. With such a mechanism it would be possible to preserve ATM QoS guarantees, provided flexible bandwidth loss distribution, provide a predictable effect on ATM connections and make efficient use of the available bandwidth.

SUMMARY OF THE INVENTION

In accordance with one aspect of the invention, there is provided a method of reducing bandwidth loading by a bandwidth reduction amount in a communications interface having elastic and non-elastic call connections, the elastic and non-elastic all connections having associated current call rates and equivalent cell rates respectively, the method comprising the steps of:
  a) reducing the current cell rate of each elastic connection; and
  b) releasing at least some non-elastic connections,
    the current cell rate of each elastic connection being reduced and the non-elastic connections being released until the total of the current cell rates of the elastic connections and equivalent cell rates of the non-elastic connections has been reduced by at least the bandwidth reduction amount.

In accordance with another aspect of the invention, there is provided a method of changing bandwidth loading by a bandwidth change amount in a communications interface having elastic and non-elastic call connections, the elastic and non-elastic call connections having associated current cell rates and equivalents cell rates respectively, the method comprising the steps of:
  a) determined whether the bandwidth change amount is negative or positive;
  b) when the bandwidth change amount is negative;
    i) reducing the current cell rate of each elastic connection; and
    ii) releasing at least some non-elastic connections.
      the current cell rate of each elastic connection being reduced and the non-elastic connections being released until the total of the current cell rates of the elastic connections and the equivalent cell rates of the non-elastic connections have been reduced by at least the bandwidth change amount; and
  c) when the bandwidth change amount is positive;
    i) increasing the current cell rate of each elastic connection;

In accordance with another aspect of the invention, there is provided a method of increasing bandwidth loading by a bandwidth change amount in a communications interface having elastic call connections and disabled non-elastic call connections, the elastic call connections having associated current cell rates, the method comprising the steps of:
  a) increasing the current cell rate of each elastic connections; and
  b) re-establishing at least some disabled non-elastic connections.

In accordance with another aspect of the invention, there is provided an apparatus for reducing bandwidth loading by a bandwidth reduction amount in a communications interface having elastic and non-elastic call connections, the elastic and non-elastic call connections having associated current cell rates and equivalent cell rates respectively, the apparatus comprising:
  a processor programmed to:
    a) reduce the current cell rate of each elastic connection; and,
    b) release at least some non-elastic connections, the current cell rate of each elastic connection being reduced and the non-elastic connections being released until the total of the current cell rates of the elastic connections and equivalent cell rates of the non-elastic connections have been reduced by at least the bandwidth reduction amount.

In accordance with another aspect of the invention, there is provided an apparatus for changing bandwidth loading by a bandwidth change amount in a communications interface having elastic and non-elastic call connections, the elastic and non-elastic call connections having associated current cell rates and equivalent cell rates respectively, the apparatus comprising:
  a processor programmed to:
    a) determine whether the bandwidth change amount is negative or positive;
    b) when the bandwidth change amount is negative;
      i) reduce the current cell rate of each elastic connection; and
      ii) release at least some non-elastic connections, the current cell rate of each elastic connection being reduced and the non-elastic connections being released until the total of the current cell rates of the elastic connections and the equivalent cell rates of the non-elastic connections has been reduced by at least the bandwidth change amount; and
    c) when the bandwidth change amount is positive;
      i) increase the current cell rate of each elastic connection.

In accordance with another aspect of the invention, there is provided an apparatus for increasing bandwidth loading by a bandwidth change amount in a communications interface having elastic call connections and disabled non-elastic call connections, the elastic call connections having associated current cell rates, the apparatus comprising:
  a processor programmed to:
    a) increase the current cell rate of each elastic connection; and b) re-establish at least some disabled non-elastic connections.

In accordance with another aspect of the invention, there is provided a method if distributing elastic and non-elastic call connections having known bandwidths over a plurality of communications links providing a total communications bandwidth, the method comprising the steps of:

a) assigning pool available bandwidth values representing respective portions of the total communications bandwidth to respective bandwidth pools associated with respective call connection service categories;

b) admitting call connections on the plurality of communications links and associating admitted call connections with bandwidth pools associated with respective call connection service categories identified by respective the admitted call connections;

c) maintaining a measure of a pool admitted bandwidth representing the bandwidth occupied by admitted call connections, the pool admitted bandwidth being the cumulative sum of the known bandwidth of the admitted call connections; and, d) preventing the admission of a further call connection when the known bandwidth of the further call connection added to the pool admitted bandwidth of the pool with which the further call wold be associated exceeds the bandwidth provided, of the pool with which the further call would be associated.

BRIEF DESCRIPTION OF THE DRAWINGS

In drawing which illustrate embodiments of the invention,

FIG. 10a is a connection table having values produced after execution of the elastic reduction algorithm of FIG. 10, according to the first embodiment of the invention;

DETAILED DESCRIPTION

Figure 1:
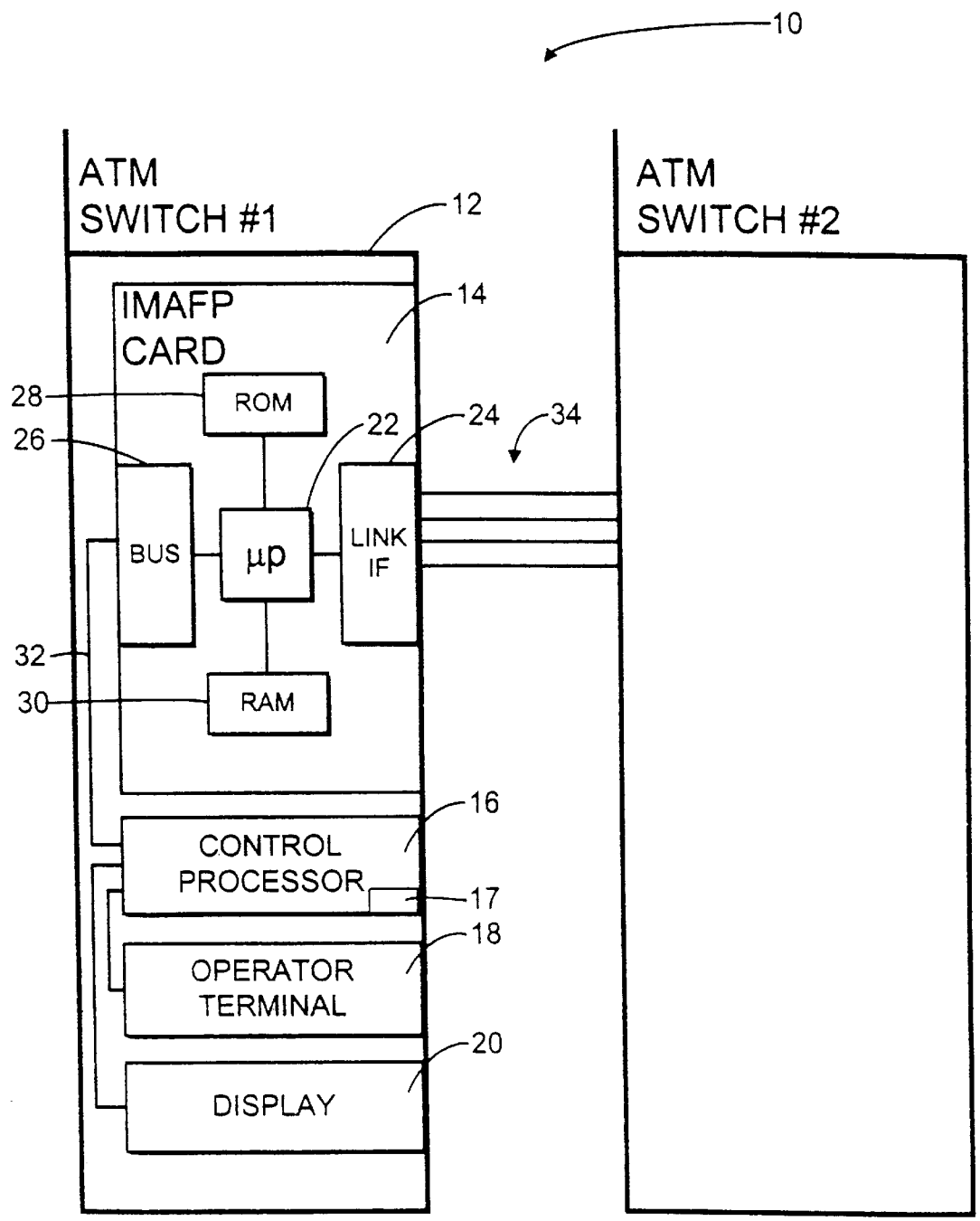
FIG. 1 is a schematic representation of a first ATM switch according to a first embodiment of the invention.

Referring to FIG. 1, an apparatus for changing bandwidth loading by a bandwidth change amount in an asynchronous transfer mode (ATM) interface, according to a first embodiment of the invention is shown generally at 10. The apparatus includes an ATM switch 12 having an inverse multiplexer for ATM functional processor (IMAFP) card 14, a control processor 16, an operator terminal 18 and a display 20. The switch includes a bus 32 connected to the bust interface 26 to facilitate communication between the ATM functional processor card 14, the control processor 16, the operator terminal 18 and the display 20 in the ATM switch 12. It will be appreciated that there may be a plurality of IMAFP cards similar to card 14, all connected to the same bus 32 for communication with the control processor 16.

IMAFP Card

The IMAFP card 14 includes a microprocessor 22, a link interface 24, a bus interface 26, read only memory 28 and random access memory 30. The link interface 24 is connected to a plurality, in this embodiment, 4 ATM communications links shown generally at 34. The ATM communications links, in this embodiment, are type E1 and each have a bit rate capacity of approximately 2 MB/sec. Thus, the total bandwidth available using all four links is 8 MB/sec. In this embodiment, the IMAFP card is of the type used in a Nortel Passport ATM switch, available from Northern Telecom Limited of Montreal, Canada.

System Parameters

FIG. 2

An operator of the system uses the operator terminal 18 to access the control processor 16 to set card parameters shown generally at 36. The card parameters include a link type 38, in this case E1, a bit rate 40, in this case 2 MB/sec, reflecting the bit rate for each E1 link, a number of links 42, in this case 4 links, and a total bit rate 44, in this case, a total of 8 MB/sec calculated as the product of the bit rate 40 and the number of links 42, ie., 2 MB/sec×4–8 MB/sec.

Pool Parameters

FIG. 3

For each IMAFP card 14, the operator specifies connection pools, each associated with a different connection type.

Figures 2, 3:
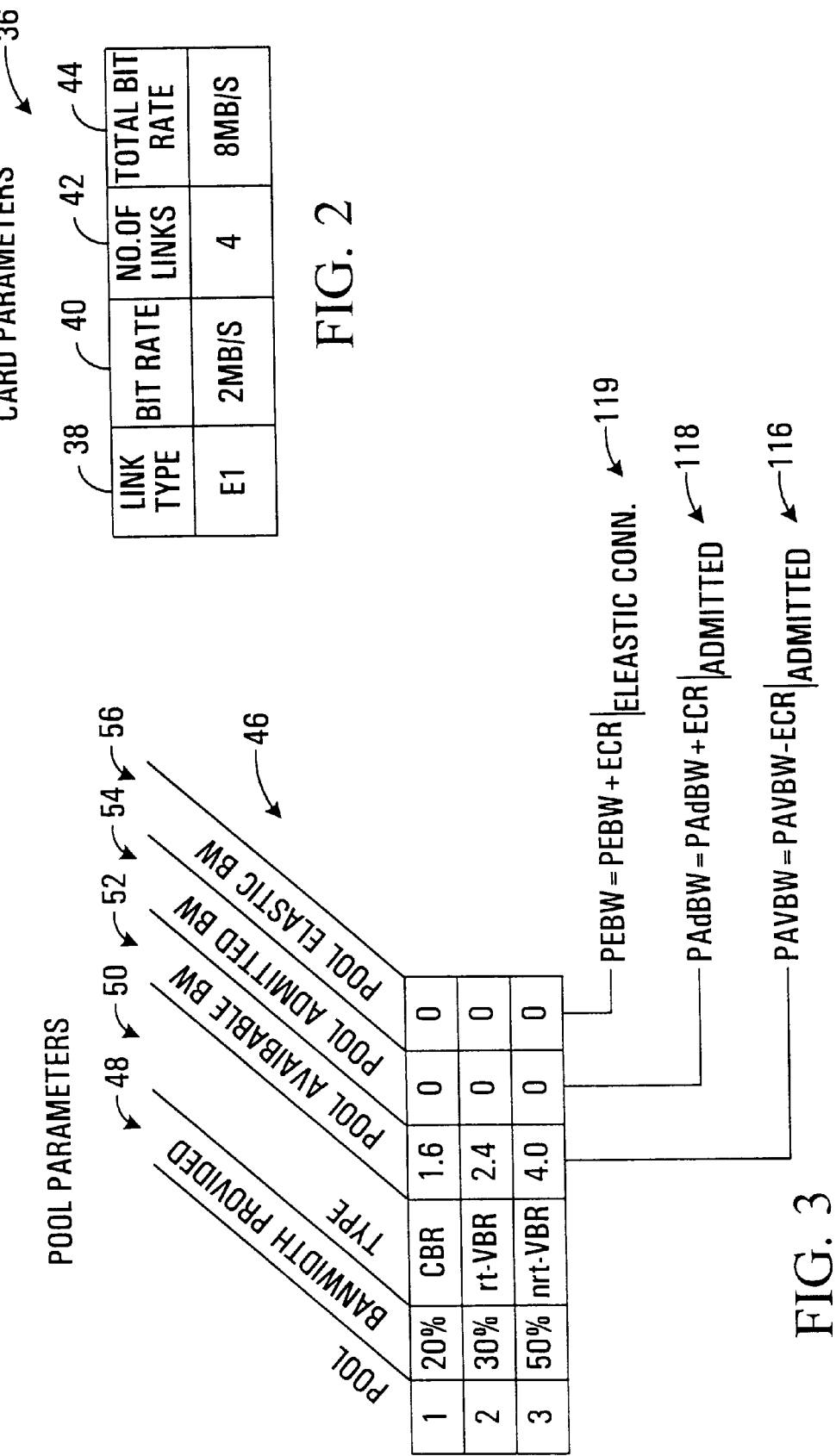
FIG. 2 is a table indicating card parameters of a inverse multiplexer for ATM functional processor (IMAFP) card, the table being stored and accessed by a control processor of the first ATM switch and by an IMAFP processor on the IMAFP card, according to the first embodiment of the invention.
FIG. 3 is a table representing pool parameters of the IMAFP card, the table being stored and accessed by the control processor of the first ATM switch and by the IMAFP processor of the IMAFP card, according to the first embodiment of the invention.

Referring to FIG. 3, constant bit rate (CBR) connections are associated with pool number 1, real time variable bit rate rt-VBR connection types are associated with pool number 2 and non-real time variable bit rate (nrt-VBR) connections are associated with pool number 3. Such association is stored in memory 17, in the form of a table as shown generally at 46 in FIG. 3. In this embodiment, there is associated with each pool, a bandwidth provided field 48, a type field 50, a pool available bandwidth field 52, a pool admitted bandwidth field 54 and a pool elastic bandwidth field 56. The type field 50 is used to associate connection types with respective pools. The bandwidth provided field 48 is used to specify the percentage of bandwidth serviced by the IMAFP card, which is to be associated with the respective pool. In this embodiment, constant bit rate (CBR type connections) are permitted to comprise up to 20 percent of the bandwidth or total bit rate of the IMAFP card.

The pool available bandwidth field 52 is used to store a number representing the available bandwidth, calculated on the basis of the bandwidth provided and the total bit rate of the IMAFP card 14. Thus, in this embodiment, with a bandwidth provided of 20 percent and a total bit rate of 8 MB/sec (as determined from field 44 in FIG. 2), the pool available bandwidth for CBR type connections is 1.6 MB/sec.

The pool admitted bandwidth field 54 is used to store a number representing the bandwidth occupied by the call connections established at any given time. In the present embodiment, the pool admitted bandwidth is presently 0 and there are no CBR type connections established.

The pool elastic bandwidth field 56 is used to store a number representing the bandwidth currently used by elastic call connections or the CBR type. Thus, the ATM interface may be said to have elastic and non-elastic all connections. In the present embodiment, it can be seen that there are no such connections as indicated by the 0 in this field.

Similarly, in the embodiment shown, the operator has allocated 30 percent of the bandwidth provided to pool number 2, of the rt-VBR type resulting in a total pool available bandwidth of 2.4 MB/sec. In addition, the operator has specified that call connections of the nrt-VBR type are to be associated with pool 3 and are to be allocated 50 percent of the bandwidth provided for a total available bandwidth of 4 MB/sec.

Call Set-up Message

FIG. 4

Figure 4:
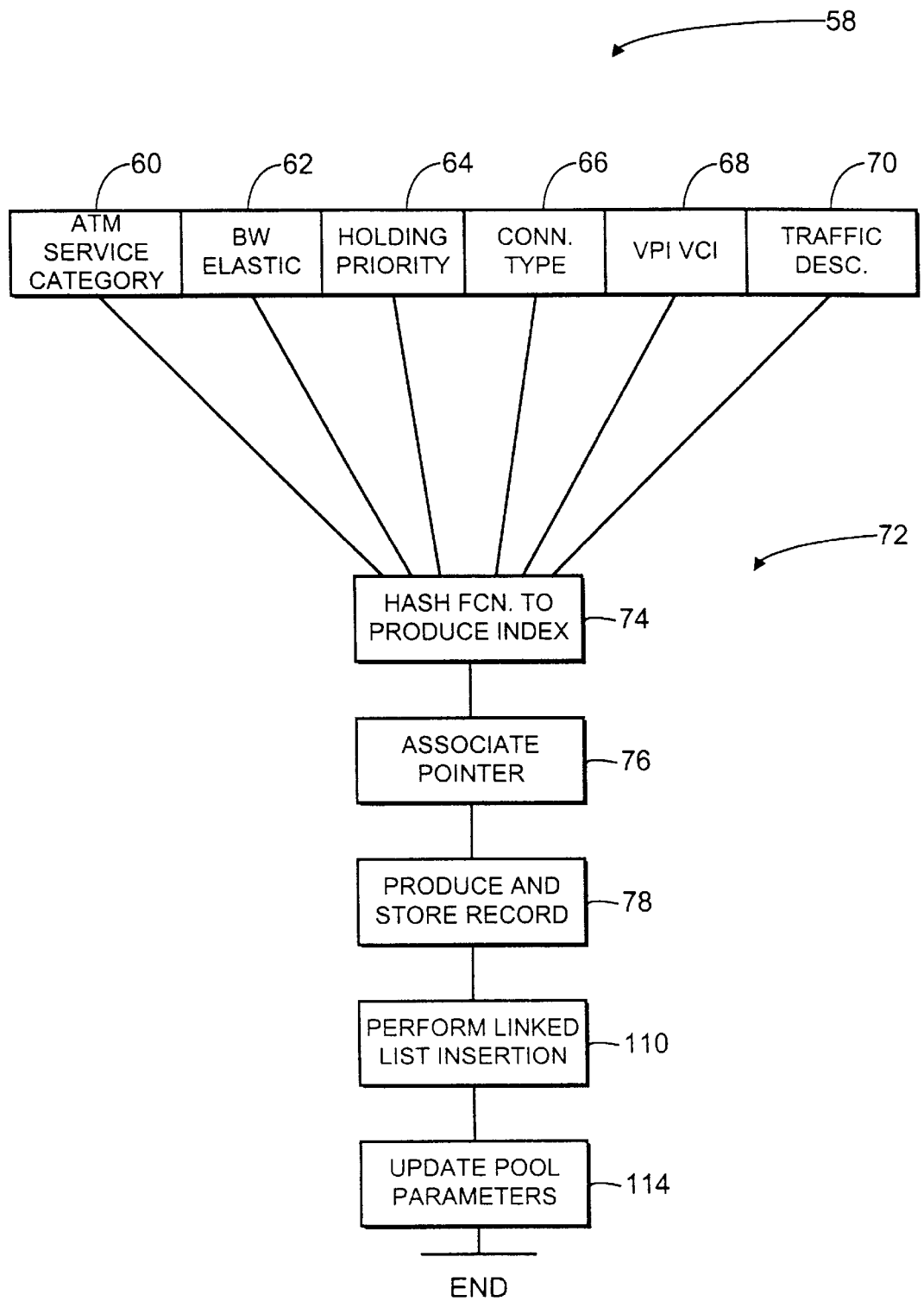
FIG. 4 is a flowchart showing a connection table/connection bandwidth control (CBC) tree algorithm executed by the IMAFP processor, according to the first embodiment of the invention.

Referring to FIG. 4, the establishment of a connection at the IMAFP card 14 is done in response to receipt of a call set-up message, shown generally at 58. The call set-up message may be provided by the operator or may be received in an ATM communication at the ATM switch, and includes an ATM service category field 60, a bandwidth elasticity field 62, a holding priority field 64, a connection type field 66, a vpi.vci field 68 and a traffic descriptor field 70.

The ATM service category defines the type of category as being CBR, rt-VBR or nrt-VBR. The bandwidth elasticity field 62 identifies whether or not the connection type is to be elastic. An elastic connection is one which can withstand a reduction in allocated bandwidth, without compromising service guarantees for the delivery of data. In other words, elastic connections are used to carry data which is not required to be transmitted at a specific bit rate.

The holding priority field 64 carries a number from 0–4 representing the holding priority of the connection. The actual holding priority is inversely proportional to the number indicating the holding priority, ie., a connection having a holding priority of 4 has the least highest priority, while a connection having a holding priority of 0 has the highest holding priority.

The connection type field 66 identifies the connection type as being either dynamic or static. A dynamic connection is one which is established dynamically by the network in response to a set-up message received at the switch whereas a static connection is one which is manually set-up by the operator.

The vpi.vci field 68 includes a first number representing the virtual path identifier (vpi) and includes a second number representing the virtual channel identifier (vci) of the connection.

The traffic descriptor field 70 includes values representing the peak cell rate, the sustainable cell rate and the maximum burst size.

Connection Record Algorithm

Figure 5:
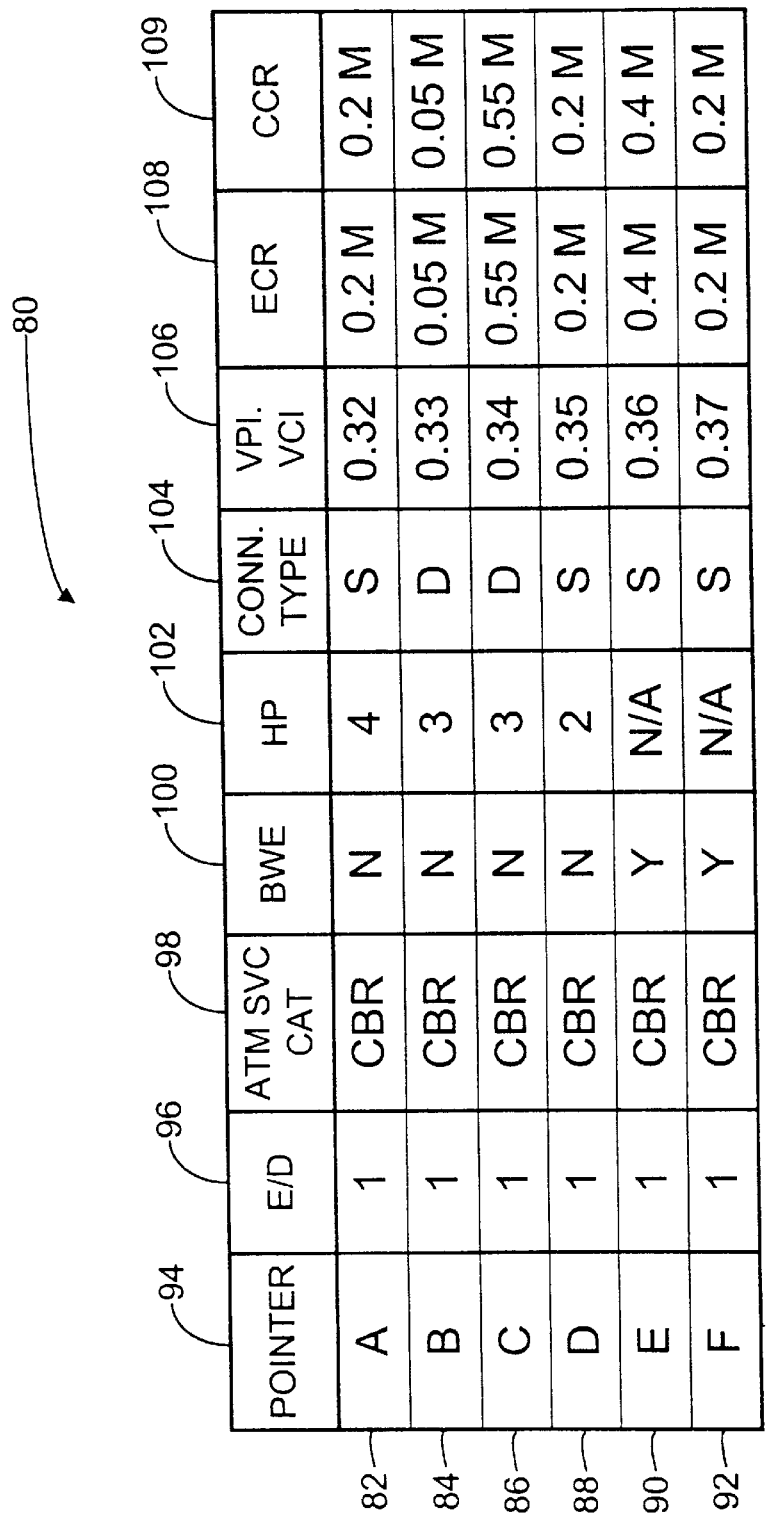
FIG. 5 is a connection table implemented in the IMAFP card and accessed by the IMAFP processor, according to the first embodiment of the invention.
Figure 6:
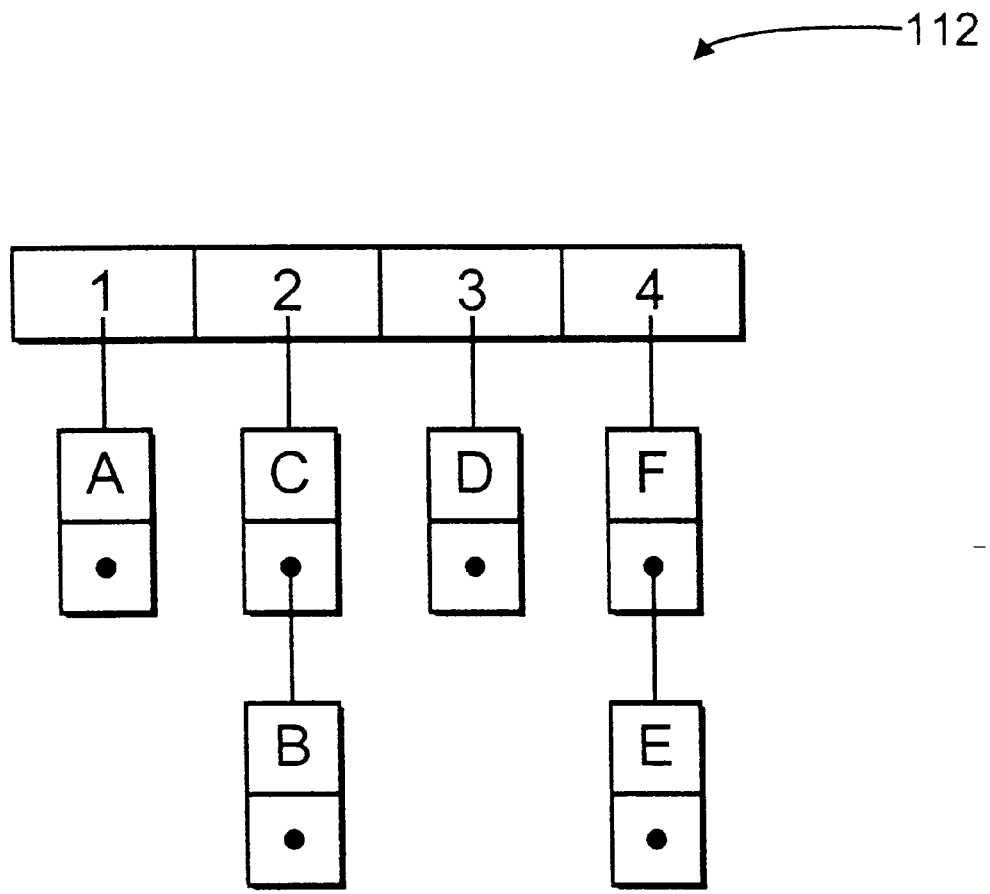
FIG. 6 is a CBC tree, accessed by the IMAFP processor according to the first embodiment of the invention.

FIGS. 4, 5 and 6

Still referring to FIG. 4, upon receipt of a set-up message 58, the connection table/CBC tree algorithm shown generally at 72 is run by the IMAFP processor 22 shown in FIG. 1. Referring to FIG. 4, the connection table/CBC tree algorithm begins with block 74 which directs the IMAFP processor 22 to apply certain fields of the set-up message to a hash function to produce an index value. To do this, the processor reads the ATM service category 60, the bandwidth elasticity field 62, the holding priority field 64 and the connection type field 66 and applies the contents of these fields to the hash function. The hash function produces an index number, in this example 1, 2, 3 or 4, which effectively associates a release priority with each of the elastic and non-elastic connections in order of ATM service category bandwidth elasticity, holding priority and connection type.

After producing an index number, block 76 directs the processor to select a memory location in memory 30, in which to store a connection table record associated with the call connection defined by the set-up message. In this embodiment, pointers A–F are used where the letters identify addresses of respective blocks of memory locations of memory 30, which are used to store respective connection records.

Block 78 then directs the IMAFP processor 22 to produce and store a connection record produced from the set-up message 58.

Connection Table

FIG. 5

Referring to FIG. 5, a connection table shown generally at 80 is maintained by the control processor 16 to store a plurality of connection records 82, 84, 86, 88, 90 and 92. Each connection record includes a pointer field 94, an enable/disable field 96, an ATM service category field 98, a bandwidth elastic field 100, a holding priority field 102, a connection type field 104, a vpi.vci field 106, an effective cell rate field 108, and a current cell rate field 109. The pointer field 94 for each record is loaded with a value produced at block 76 in the connection table/CBC tree algorithm shown in FIG. 4. The contents of the enable/disable field 96 are set to 1 or 0, depending upon whether or not the connection is enabled or disabled. Initially, a particular connection is enabled when a set-up message is received, however, the connection may be disabled, or enabled, for example as a result of processing as to be described below.

The ATM service category field 98 includes a value which is copied from the ATM service category field 60 of the set-up message 58 shown in FIG. 4. Similarly, the bandwidth elastic field 100, holding priority field 102, connection type field 104 and vpi.vci field 106 are loaded with copies of the contents in fields 62, 64, 66 and 68, shown in FIG. 4, by the same names. The effective cell rate field 108 is loaded with a value calculated according to conventional methods, on the basis of the traffic descriptor information which includes the peak cell rate, the sustainable cell rate and the maximum burst size. Thus, the elastic and non-elastic connections have associated equivalent cell rates.

The current cell rate field 109 is loaded with the current cell rate of the associated connection, as determined in the conventional manner by the IMA functional processor. Thus, the elastic and non-elastic connections have associated current cell rates. The values indicated represent values which might be expected to be determined, before any algorithms according to this embodiment of the invention are executed.

CBC Tree

FIG. 6

Referring back to FIG. 4, block 110 directs the IMAFP processor 22 to perform a linked list insertion. Referring to FIGS. 4 and 6, this involves linking the pointer established at block 76 with the index produced at block 74, to produce a connection bandwidth control (CBC) tree as shown in FIG. 6. In the CBC tree shown generally at 112 in FIG. 6, each index identifies a particular type of connection, that is, each index is for connection records having a respective group of attribute fields with common entries. Associated with the index is stored an address of a connection record in the connection table 80 shown in FIG. 5, which is the least desirable to maintain. Thus, the processor is programmed to produce a 'linked' list of pointers to connection records associated with respective sorting indices. The desirability to maintain a connection within an index category is determined by the contents of the vpi.vci field 68 of the set-up message. Thus, the processor associates a release priority with each of the non-elastic and elastic connections through the index and the linking of the pointers under the index. In effect therefore, the processor is programmed to prioritize call connection records associated with respective connections, the call connection records having at least one connection attribute field, in this embodiment, the vpi.vci field, and being prioritized according to the connection attribute field. In this embodiment, a first set of sorting indices including index 4 is associated with connection records associated with elastic connections and a second set of sorting indices including indices 1, 2 and 3 is associated with connection records associated with non-elastic connections. This, it may be said that the processor is programmed to prioritize call connection records having attribute fields including an enable/disable field, an ATM service category field, a bandwidth elastic field, a holding priority field, a connection type field, a vpi.vci field and a cell rate field, by applying the contents of each of the attribute fields to a hashing function to produce a first set of storing indices for connection records associated with elastic connections and a second set of sorting indices for connection records associated with non-elastic connections.

Referring to FIGS. 4, 5, and 6, when a connection set-up message 58 is received, a corresponding index and pointer are produced at blocks 74 and 76 in the algorithm shown in FIG. 4. A connection record is then produced and stored in the connection table, in no particular order. The purpose of the connection table is simply to maintain a record of the connections currently established on the IMAFP card. In the CBC tree shown generally at 112 in FIG. 6, each index identifies a particular type of connection. Associated with the index is stored an address of a connection record in the connection table 80 shown in FIG. 5, which has the least priority to maintain. The priority to maintain a connection within an index category is determined by the contents of the vpi.vci field 68 of the set-up message. Thus, broadly in any application where there are both non-elastic and elastic connections at least first and second sorting indices will be produced by the processor. First and second linked lists of pointers to records associated with each index will also be produced by the processor.

Referring back to FIG. 4, the connection table/CBC algorithm 72 further includes block 114 which directs the IMAFP processor 22 to update the pool parameters, shown in FIG. 3, each time a new set-up message is received. In this regard, the pool available bandwidth is recalculated according to the equation shown generally at 116 which provides that the pool available bandwidth is equal to the current pool available bandwidth (PABW) less the equivalent cell rate (ECR) of the connection just admitted to the pool, ie., the connection corresponding to the record just added to the connection table. The pool admitted bandwidth is calculated according to equation 118 which calculates the new pool admitted bandwidth as the previous pool admitted bandwidth plus the equivalent cell rate of the connection just admitted. Finally, the pool elastic bandwidth is calculated according to equation 119 which calculates the new pool elastic bandwidth as the previous pool elastic bandwidth plus the equivalent cell rate of the connection, if the bandwidth elastic field 100 of the record indicates that the connection is bandwidth elastic. Thus, the contents of the pool available bandwidth field 52, the pool admitted bandwidth field 54 and the pool elastic bandwidth field 56 are continually updated as new connections are added or taken away from the pool.

Furthermore, the pool parameters are updated whenever the bandwidth for a connection is changed. The contents of the pool admitted bandwidth field are updated whenever a non-elastic connection is released or re-admitted.

The contents of the pool elastic bandwidth field are updated whenever the bandwidth of an elastic connection is reduced or increased.

Figure 6A:
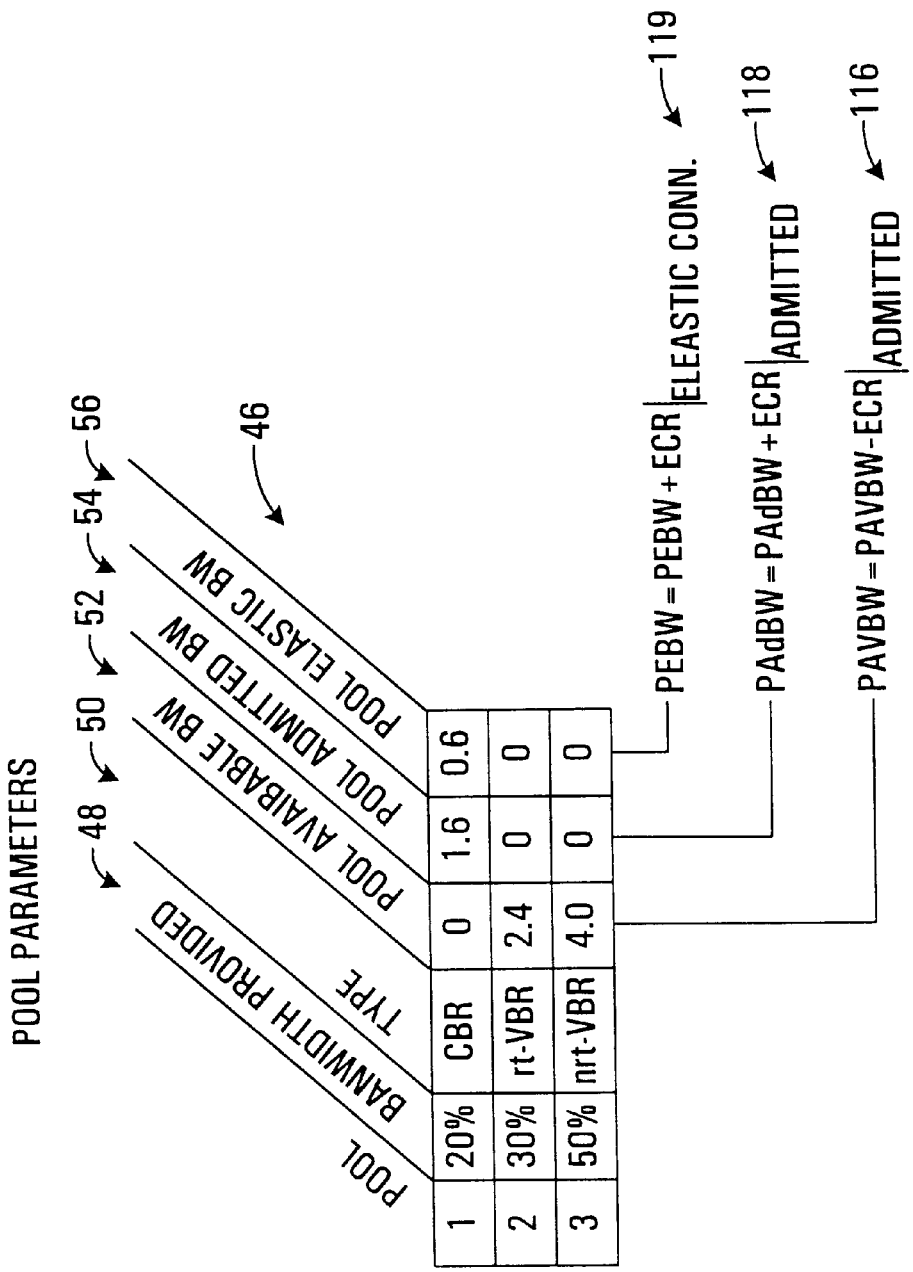
FIG. 6a is a table representing pool parameters of the IMAFP card upon admission of the connection records of FIG. 5, according to the first embodiment of the invention.

Referring to FIG. 6a, the contents of the pool parameters table are shown to reflect values expected after the connection records of FIG. 5 have been admitted.

Referring back to FIG. 1, in the event that one of the links 34 becomes inoperative, the link interface sends an IMA down-speed massage to the IMAFP processor 22. The IMA down-speed message includes an indication of the loss in bandwidth resulting from the lost link and, in this embodiment, with one link inoperative the loss is 2 MB/sec.

Bandwidth Loss Distribution Algorithm

FIG. 7

Figure 7:
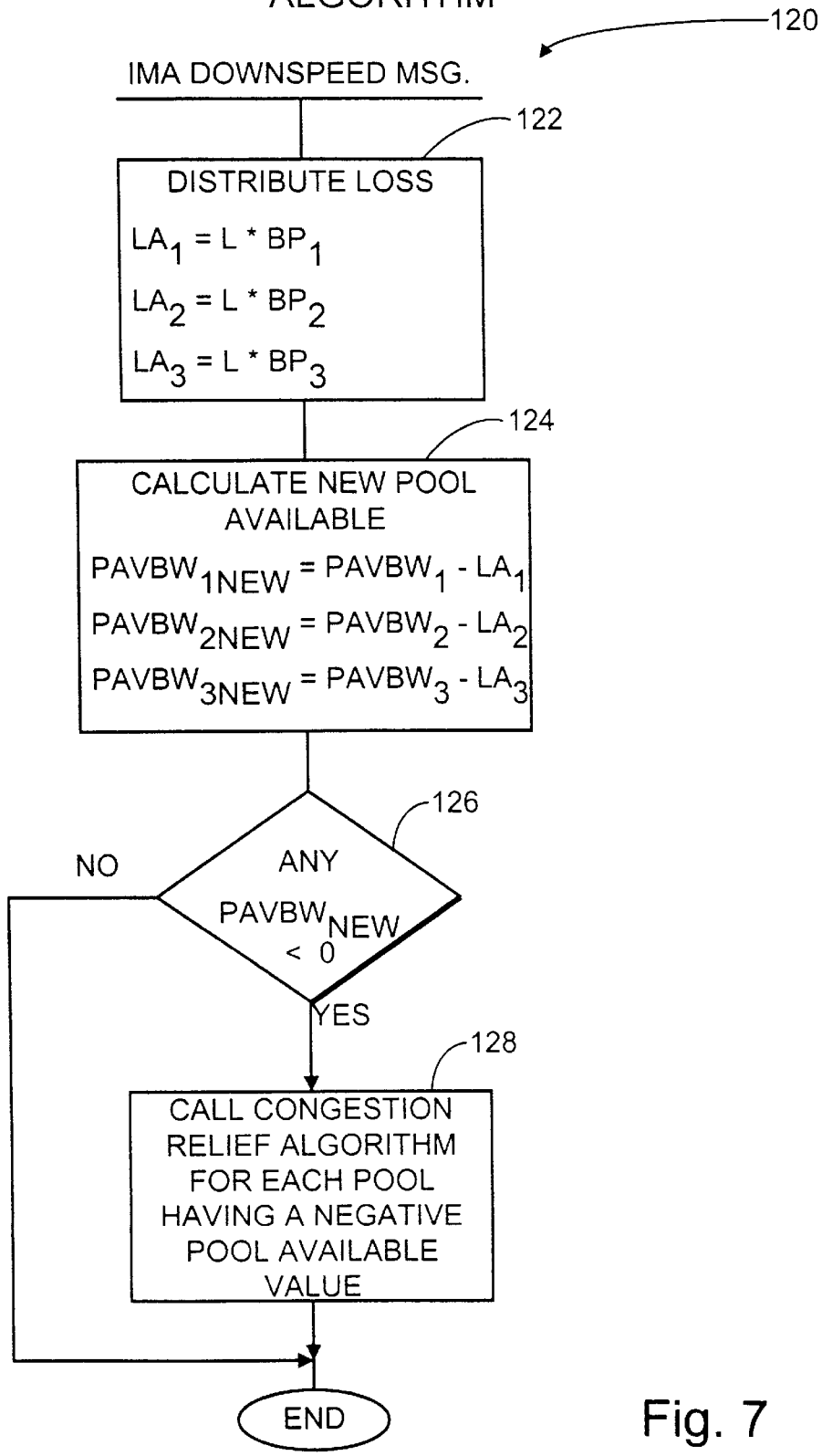
FIG. 7 is a flowchart of a bandwidth loss distribution algorithm executed by the IMAFP processor, according to the first embodiment of the invention.

Referring to FIG. 7, when an IMA down-speed message is received at the IMAFP processor 22, the processor executes code implementing a bandwidth loss distribution algorithm shown generally at 120. This algorithm begins with block 122 which distributes the loss among the bandwidth pools and calculates the bandwidth loss amounts for each pool. The bandwidth loss amounts are calculated according to the relation:

$$LA[n] = L \times BP[n]$$

| where: | L | is equal to the bandwidth loss (2 MB/sec); |
|---|---|---|
| | BP[n] | is equal to the bandwidth provided as determined from the bandwidth provided field 48 of the pool parameters table 46 in FIG. 3; and |
| | LA[n] | is the loss amount associated with pool n. |

Thus, in this embodiment, the loss amounts or bandwidth change amounts are 0.4 MB/sec, 0.6 MB/sec and 1.0 MB/sec, respectively.

Block 124 then directs the IMAFP processor 22 to calculate the new pool available bandwidth values as a result of the loss in bandwidth. New pool available bandwidth values are calculated according to the relation:

| where | PAvBW[n] | is the pool available bandwidth value as determined from the pool available bandwidth field 52 of each pool parameter record as shown in FIG. 3; |
|---|---|---|
| | LA[n] | is the loss amount calculated in block 122; and |
| | PAvBW[n new] | is the new pool available bandwidth value. |

In this embodiment, the new pool available bandwidth values are negative 0.4, positive 1.8 and positive 3.0, respectively. Thus, block 124 directs the processor to determine new pool available bandwidth values reflecting bandwidth change amounts and whether such amounts are positive or negative, for each pool.

Block 126 then directs the IMAFP processor 22 to determine whether or not any of the new pool available bandwidth values is less than 0. If none are found to be less than 0 then the bandwidth loss algorithm is ended. If, however, at least one value is less than 0, block 128 directs the processor to call the congestions relief algorithm. The congestion relief algorithm is called for each pool having a negative pool available bandwidth value. In this embodiment, only pool 1 has a negative pool available bandwidth value.

Congestion Relief Algorithm

FIG. 8

Figure 8:
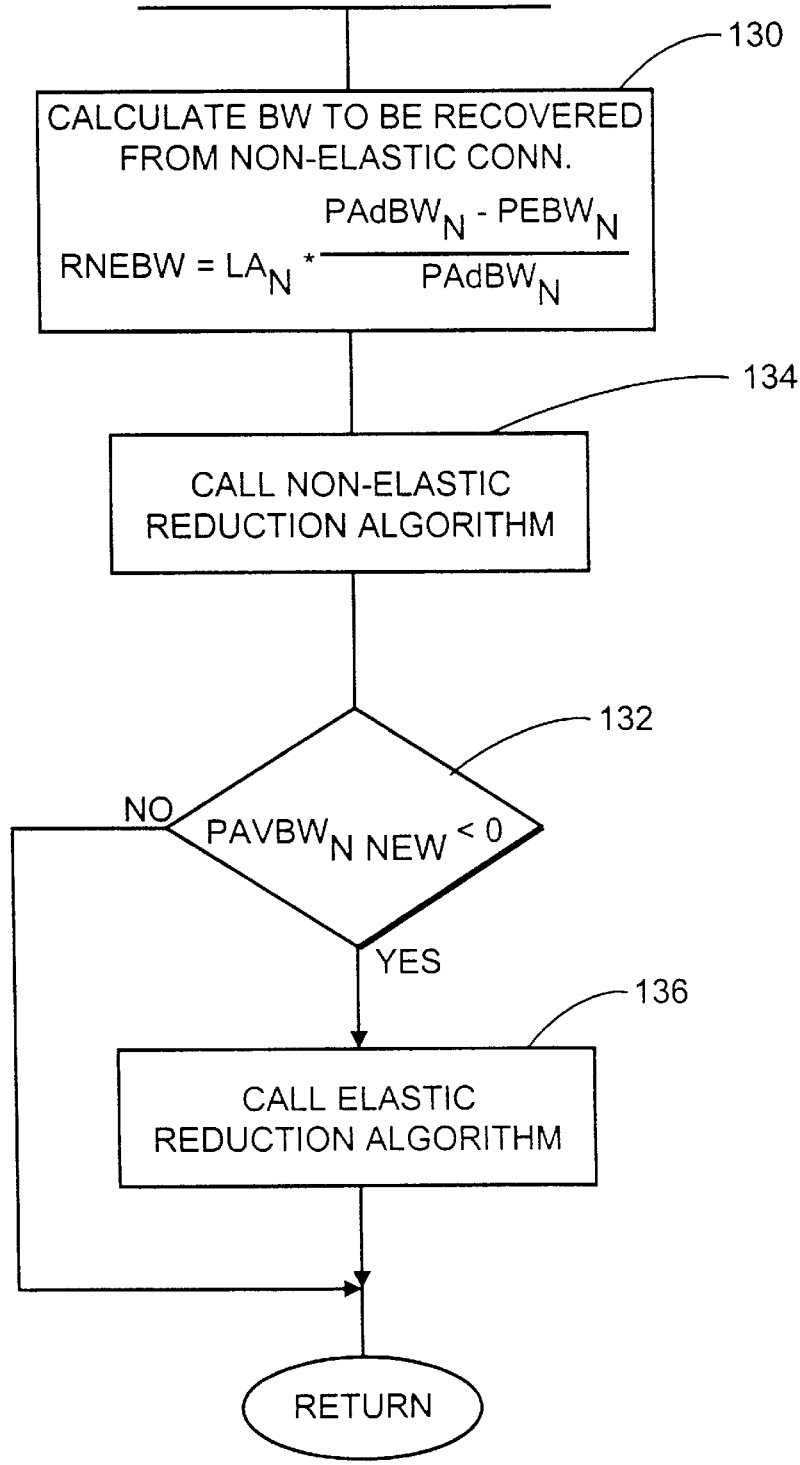
FIG. 8 is a flowchart of congestion relief algorithm executed by the IMAFP processor, according to the first embodiment of the invention.

Referring to FIG. 8, the congestion relief algorithm includes a first block 130 which directs the IMAFP processor 22 to calculate the bandwidth to be recovered from non-elastic connections according to the relation:

$$RNEBW[n] = LA[n] \times \frac{(PAdBW[n] - PEBW[n])}{PAdBW[n]}$$

| where: | RNEBW [n] | is the bandwidth to be recovered from non-elastic connections; |
|---|---|---|
| | LA [n] | is the loss amount calculated in block 122 of the loss distribution algorithm shown in FIG. 7; |

-continued $$RNEBW[n] = LA[n] \times \frac{(PAdBW[n] - PEBW[n])}{PAdBW[n]}$$

| | PAdBW [n] | is the contents of the pool admitted bandwidth field 54 of the pool parameters table 46 shown in FIG. 3; and |
|---|---|---|
| | PEBW [n] | is the contents of the current pool elastic bandwidth field 56 of the pool parameters table 46 shown in FIG. 3. |

After calculating the bandwidth to be recovered from the non-elastic connections in block 130, block 132 calls the non-elastic reduction algorithm which directs the processor to release non-elastic connections according to the order of the linked list associated with connection records associated with the first sorting index.

After the non-elastic reduction algorithm is completed, block 134 directs the IMAFP processor 22 to determine if the new pool available bandwidth is less than 0, and if so, block 136 calls the elastic reduction algorithm which directs the processor to reduce the bandwidth of elastic connections.

The congestion relief algorithm for a specific bandwidth pool is then ended and processing returns back to the bandwidth loss distribution algorithm 120 shown in FIG. 7.

Non-elastic Reduction Algorithm

FIG. 9

Figure 9:
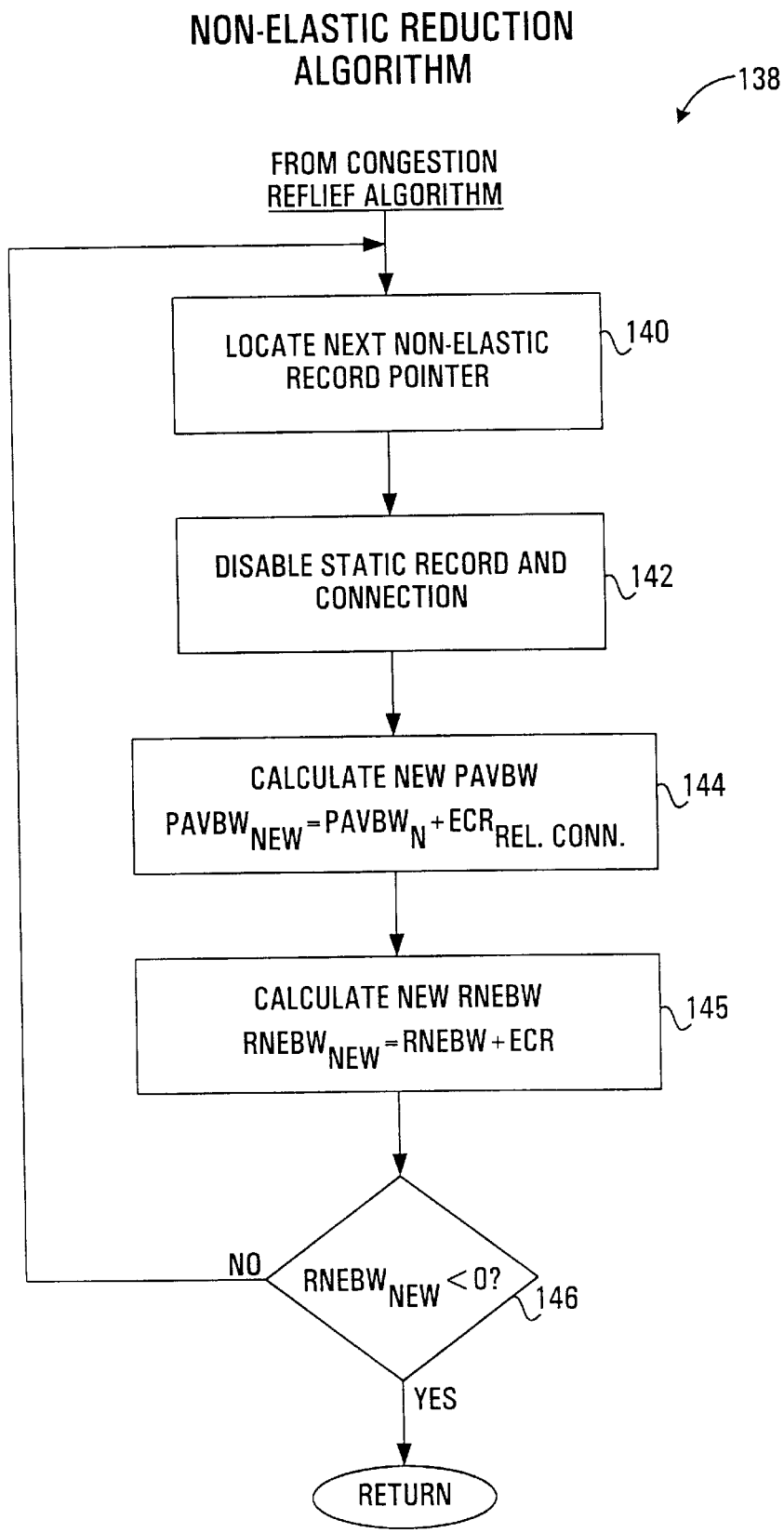
FIG. 9 is a flowchart of a non-elastic reduction algorithm executed by the IMAFP processor, according to the first embodiment of the invention.

Referring to FIG. 9, the non-elastic reduction algorithm is shown generally at 138. This algorithm includes a first block 140 which directs the IMAFP processor 22 to refer back to the CBC tree shown at 112 in FIG. 6 and to locate the first address pointer under the first index. In this embodiment, address pointer A is located. The processor then uses the pointer to refer to the connection table shown in FIG. 5, to identify the connection associated pointer B.

As pointer A is associated with a static connection as indicated in the connection type field 104 of record 82, block 142 then directs the processor to set the enable/disable field 96 contents to disable. Thus, the processor is programmed to associate a disable code with released connection records by placing the disable code in the enable/disable field 96.

Block 144 then directs the processor to calculate a new pool available bandwidth according to the relation:

| PAvBW[n new] = PAvBW[n] + ECR[released connection] | | |
|---|---|---|
| where: | PAvBW[n new] | is the new pool available bandwidth; |
| | PAvBW[n] | is the pool available bandwidth before the connection is released; and |
| | ECR[released connection] | is the equivalent cell rate of the released connection. |

Block 145 then directs the processor to calculate a new non-elastic recovery bandwidth according to the relation:

| RNEBW[n new] = RNEBW[n] + ECR[released connection] | | |
|---|---|---|
| where | RNEBW[n new] | is the new bandwidth to be recovered from non-elastic connections; and |
| | RNEBW[n] | is the previous bandwidth to be recovered from |

| | non-elastic connections |
|---|---|
| ECR[released connection] | is the equivalent cell rate of the released connection. |

Block 146 then directs the processor to determine whether or not the RNEBW[n new] value is less than 0, or in other words, whether or not the remaining bandwidth to be recovered from non-elastic connections is less than 0. If sop, the non-elastic reduction algorithm is completed and processing returns to the congestion relief algorithm. If, on the other hand, the new pool available bandwidth is not less than 0, the processor is directed to continue processing at block 140 where the next least desirable connection is released as described above. In this embodiment, address pointer B is located next by block 140. The processor uses pointer B to refer to the connection table 80 shown in FIG. 5 to identify the connection records 84 and connection associated with pointer B. As record 84 is associated with a dynamic connection as indicated in the connection type field 104 of record 84, block 147 directs the processor to set the contents of the enable/disable filed 96 to 0 to disable thereby removing the connection associated with record 84. Thus, at least some non-elastic connections are released and the processor is programmed to release the non-elastic connections according to the release priority when the bandwidth change amount is negative. The release priority is, of course, established by the CBC tree and because the hash function used in creating the CBC tree places non-elastic dynamic connections in positions of higher priority for release than non-elastic static connections, it may be said that the processor is programmed to identify each of the non-elastic connections as static or dynamic and to release at least some non-elastic connections identified as dynamic before releasing the non-elastic connections identified as static and of the same holding priority.

After the non-elastic connections have been released, the pool parameters shown in FIG. 6a are updated to produce new pool available BW, pool admitted BW, and pool elastic BW values.

Elastic Reduction Algorithm

FIG. 10

Figure 10:
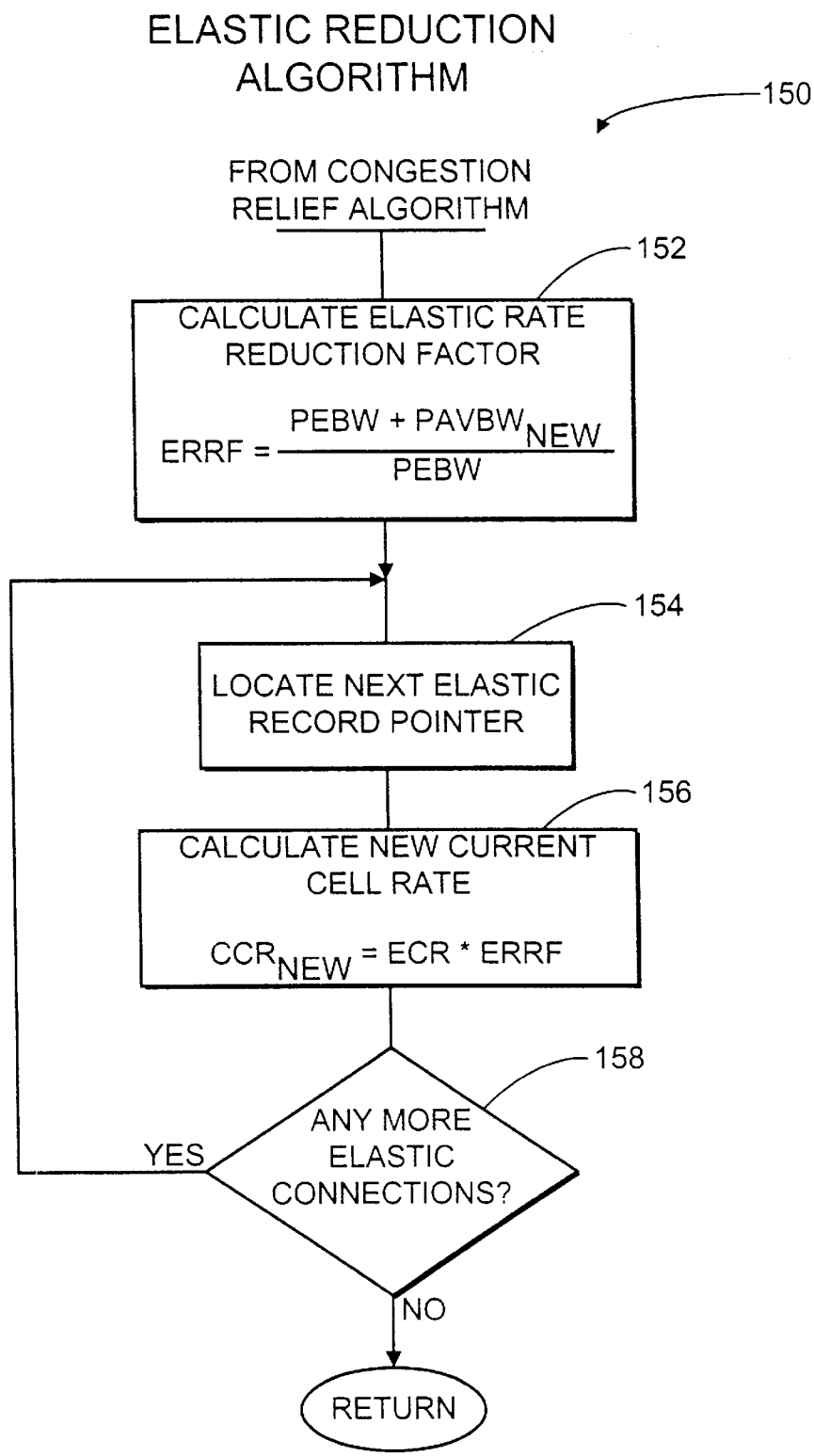
FIG. 10 is a flowchart of an elastic reduction algorithm executed by the IMAFP processor, according to the first embodiment of the invention.

Referring to FIG. 10, the elastic reduction algorithm is shown generally at 150. This algorithm includes a first block 152 which directs the IMAFP processor 22 to calculate an elastic rate reduction factor according to the relation:

$$ERRF = \frac{PEBW + PAvBW[new]}{PEBW}$$

| where: | ERRF | is the elastic rate reduction factor; |
|---|---|---|
| | PEBW | is the pool admitted elastic bandwidth; and |
| | PAvBW [new] | is the new pool available bandwidth (this value will be negative). |

Block 154 then directs the processor to refer back to the CBC tree to get the first pointer associated with elastic connections. In this embodiment, this pointer is pointer E.

Block 156 then directs the processor to retrieve the ECR value of the record associated with pointer E and to calculate a new current cell rate according to the relation:

$$CCR[new] = ECR \times ERRF$$

| where: | CCR[new] | is the new current cell rate; |
|---|---|---|
| | ECR | is the equivalent cell rate for this connection; and |
| | ERRF | is the elastic rate reduction factor as determined in block 152 |

Block 156 further directs the processor to copy the new CCR value into field 109 of record 90 in FIG. 10a, thereby reducing the current cell rate associated with the elastic connection.

Block 158 then directs the processor to determine whether or not all pointers to records associated with elastic connections have been addressed and, if not, processing continues with block 154 which directs the processor to retrieve the next pointer associated with that elastic connection. In this embodiment, that pointer is pointer F. The process of executing blocks 154 through 158 continues until the CCR values associated with respective elastic connections have been reduced, at which point the elastic reduction algorithm is completed and processing returns to the congestion relief algorithm shown in FIG. 8.

Thus, the current cell rate of each elastic connection is reduced and non-elastic connections are released until the total of the current cell rates of the elastic connections and the equivalent cell rates of the non-elastic connections has been reduced by at least the bandwidth change amount.

Figure 10B:
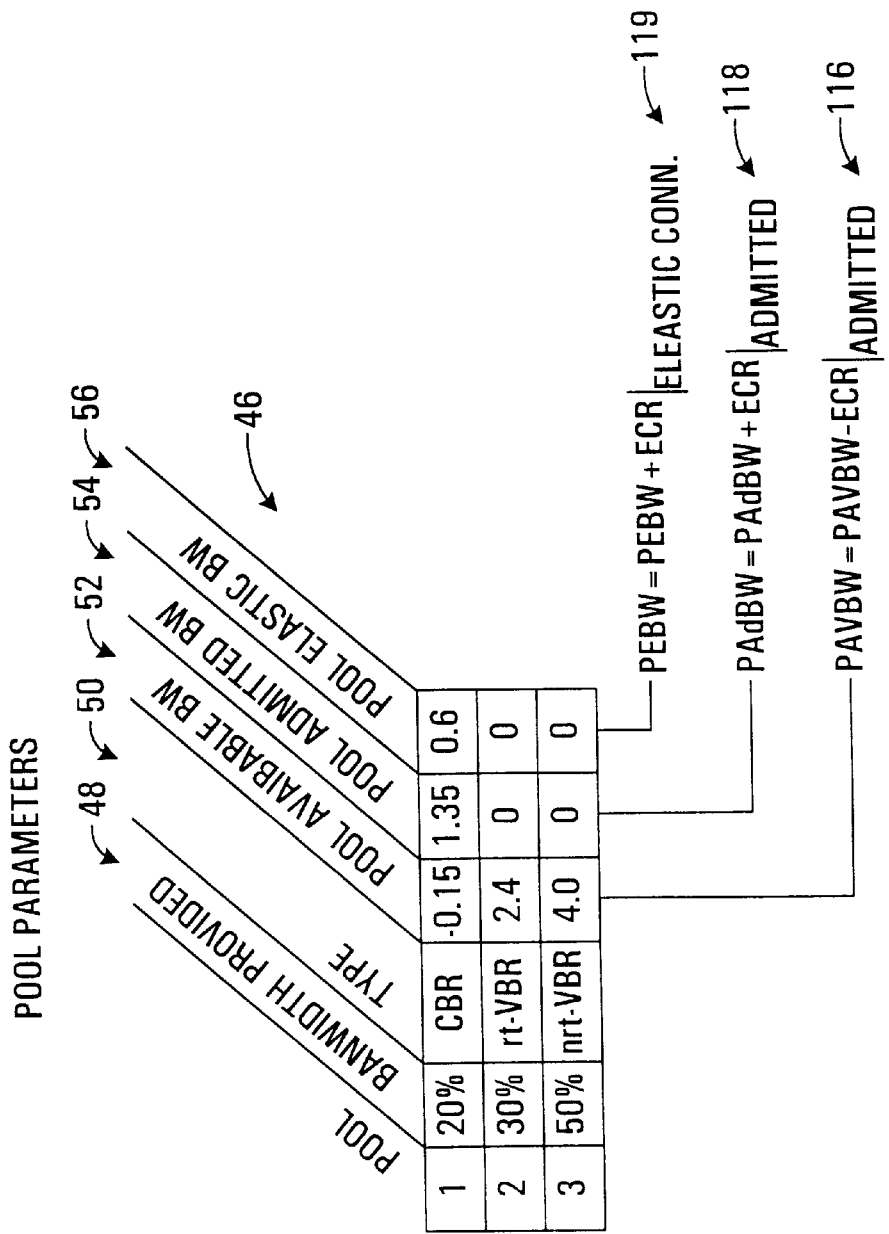
FIG. 10b is a table representing pool parameters of the IMAFP card after execution of the elastic reduction algorithm, according to the first embodiment of the invention.

Referring to FIG. 10a, the contents of the connection table 80 are shown to reflect values expected after completion of the Elastic Reduction Algorithm of FIG. 10. Referring to FIG. 10b, the contents of the pool parameters table are updated and take the values in FIG. 10b.

Up-Speed Algorithm

FIG. 11

Figure 11:
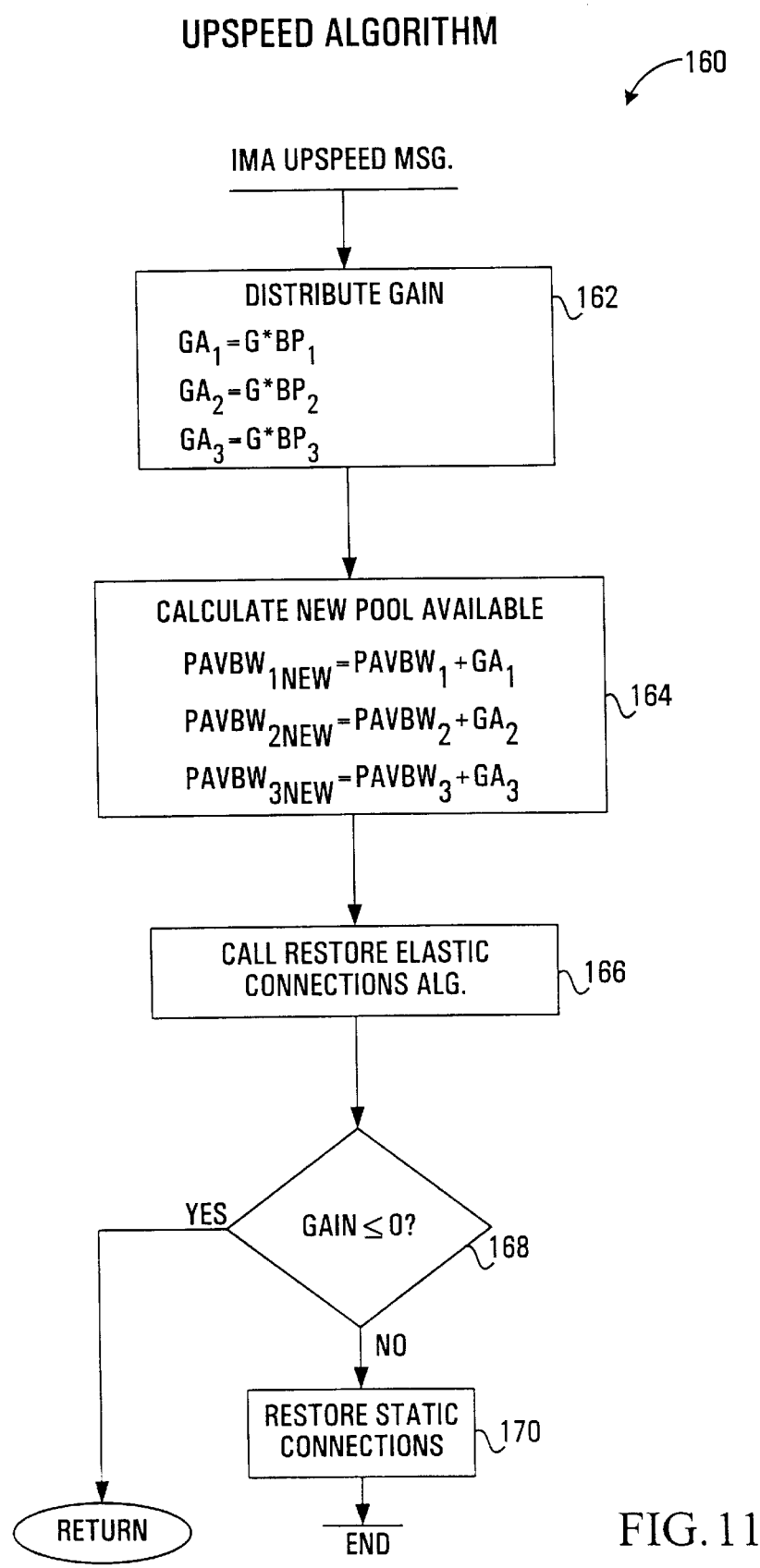
FIG. 11 is a flowchart of an up-speed algorithm executed by the IMAFP processor, according to the first embodiment of the invention.

Referring to FIG. 11, the up-speed algorithm is shown generally at 160. This algorithm is invoked by the control processor in response to an IMA up-speed message. An IMA up-speed message is similar to the down-speed message described in connection with FIG. 7 with the exception that the amount by which the bandwidth is to be increased is provided in the message. The IMAFP processor 22 interprets the IMA up-speed message as a request for an increase in bandwidth and, therefore, the bandwidth change amount is considered to be positive. Thus, the IMAFP processor 22 is able to determine whether or not the bandwidth change amount is positive or negative on the basis of the IMA Message it receives.

In response to an IMA up-speed message therefore, the up-speed algorithm begins with block 162 which directs the IMAFP processor to distribute the gain among the bandwidth pools and calculates bandwidth gain amounts for each pool. The bandwidth gain amounts are calculated according to the relation:

$$GA[n] = G \times BP[n]$$

| where | G | is equal to the bandwidth gain; |
|---|---|---|
| | BP[n] | is equal to the contents of the bandwidth provisioned field 48 of pool n in table 46 shown in FIG. 3; and |
| | GA[n] | is equal to the bandwidth gain amount of pool n. |

After calculating bandwidth gain amounts, block 164 directs the processor to calculate new pool available bandwidth values, according to the relation:

PAvBW[n new] = PAvBW[n] + GA[n]
where: PAvBW[n]   is the pool available bandwidth value as determined from the pool available bandwidth field 52 of each pool parameter record as shown in FIG. 3;
GA[n]   is the gain factor calculated at block 164; and
PAvBW[n new]   is the new pool available bondwidth value.

After calculating respective new pool available bandwidth values, block 166 directs the control processor to call the restore elastic connections algorithm. Block 168 then directs the processor to determine whether or not a gain value is less than or equal to 0 and, if so, the up-speed algorithm is ended. If not, then block 170 directs the processor to restore static connections after which the up-speed algorithm is completed.

Figure 12:
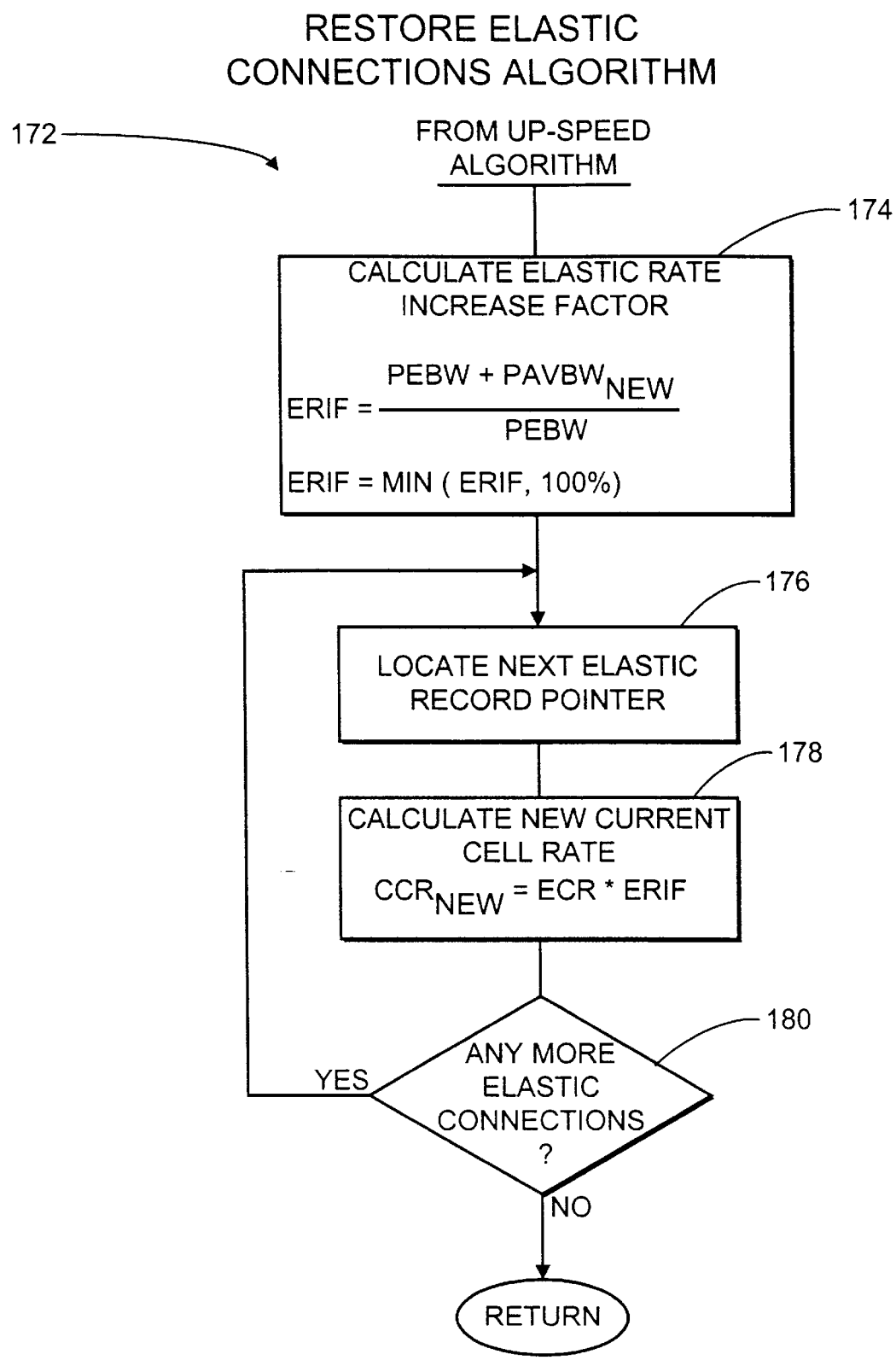
FIG. 12 is a flowchart of a restore elastic connections algorithm executed by the IMAFP processor, according to the first embodiment of the invention.

Restore Elastic Connection Algorithm
FIG. 12

Referring to FIG. 12, the restore elastic connection algorithm is shown generally at 172. The algorithm begins with block 174 which directs the IMAFP processor 22 to calculate the elastic rate increase factor according to the relation:

$$ERIF = \frac{PEBW + PAvBW[new]}{PEBW}$$

ERIF = Minimum (100%, ERIF)
where: ERIF   is the elastic rate Increase factor in %;
PEBW   is the pool admitted elastic bandwidth; and
PAvBW [new]   is the new pool available bandwidth.

Block 174 further directs the processor to use as the new elastic rate increase factor the minimum of the elastic rate increase factor of 100 percent, as more bandwidth than is required by the elastic connections can be recovered.

Block 176 then directs the processor to refer back to the CBC tree to get the first pointer associated with elastic connections. In this embodiment, this pointer is pointer E.

Block 178 then directs the processor to retrieve the BCR value of the record associated with pointer E and calculate the new current cell rate according to the relation:

CCR[new] = ECR × ERIF
where: CCR[new]   is the new current cell rate;
ECR   is the equivalent cell rate for this connection; and
ERIF   is the elastic rate increase factor as determined in block 174.

Block 178 further directs the processor to copy the new CCR value into field 109 of record 90, thereby increasing the current cell rate associated with the connection.

Block 180 then directs the processor to determine whether or not all pointers to records associated with elastic connections have been addressed, and if not, processing continues with block 176 which directs the processor to retrieve the next pointer associated with an elastic connection. In this embodiment, the next pointer is pointer F. The process of executing blocks 176 through 180 continues until the CCR values associated with respective elastic connections have been increased, at which point the restore elastic connection algorithm is completed and processing returns to the up-speed algorithm shown in FIG. 11. Thus, when the bandwidth change amount is positive, the current cell rate of each elastic connection is increased.

Figure 13:
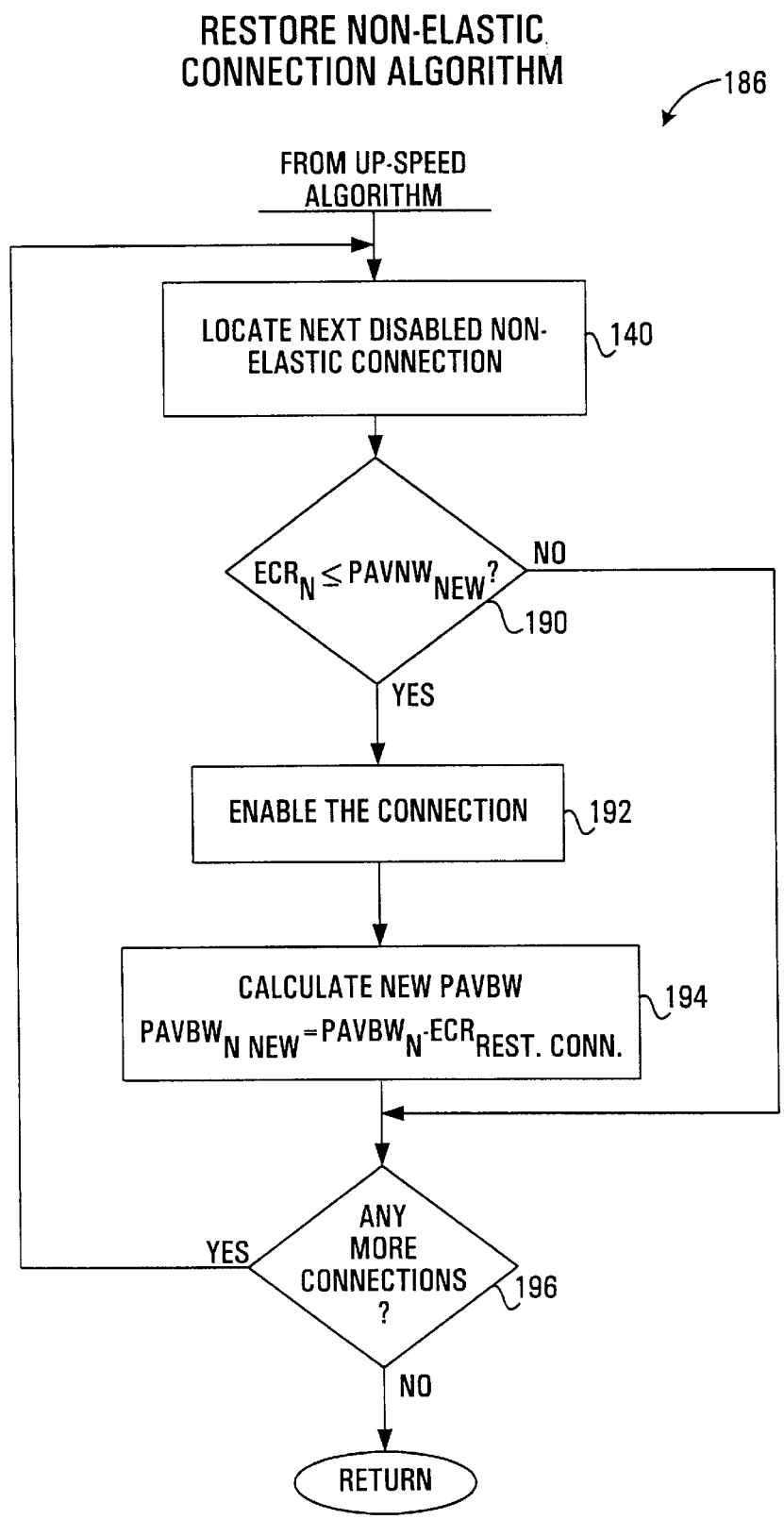
FIG. 13 is a flowchart of a restore non-elastic connections algorithm executed by the IMAFP processor, according to the first embodiment of the invention.
Figure 6A:
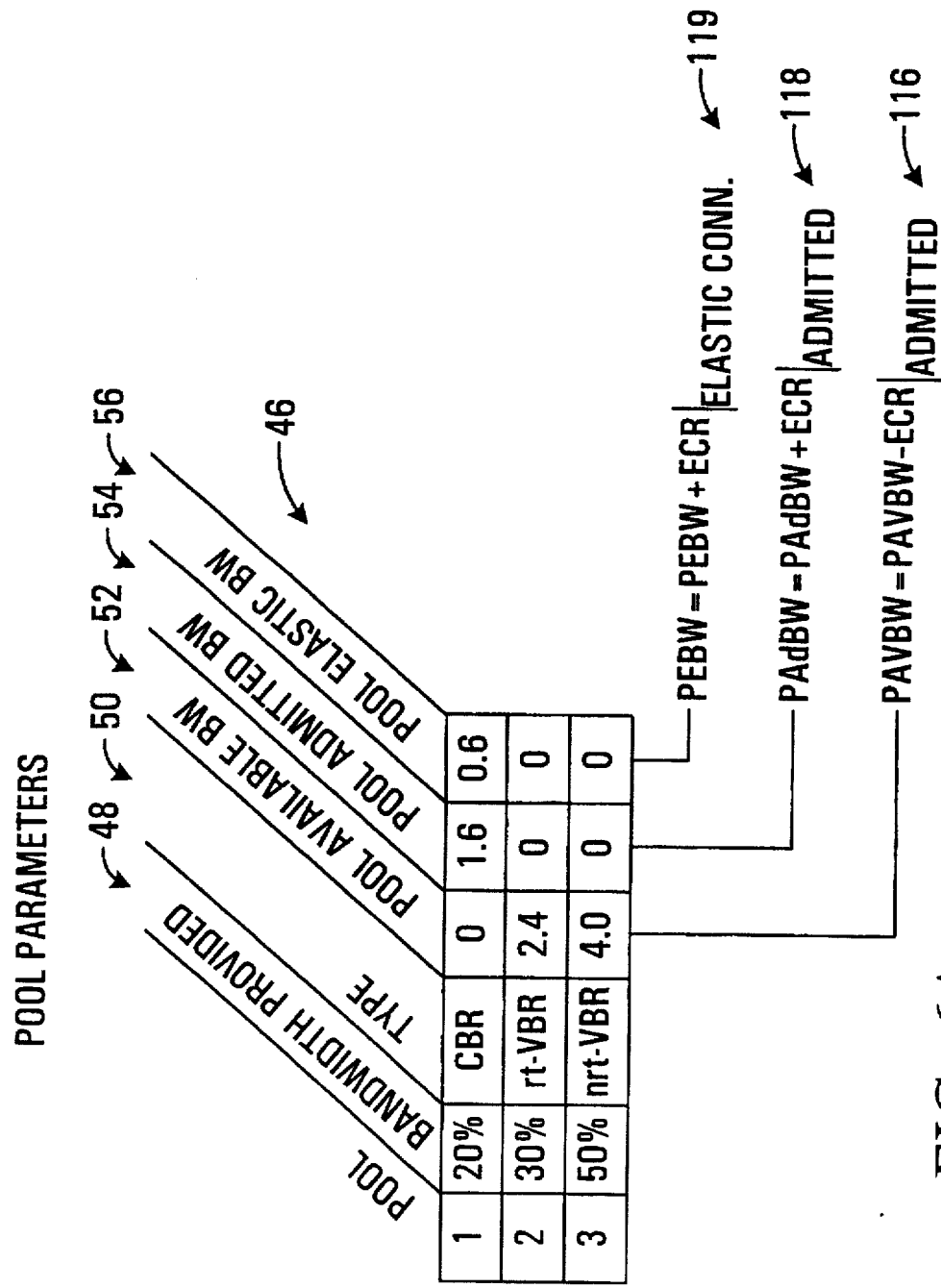
Figure 9:
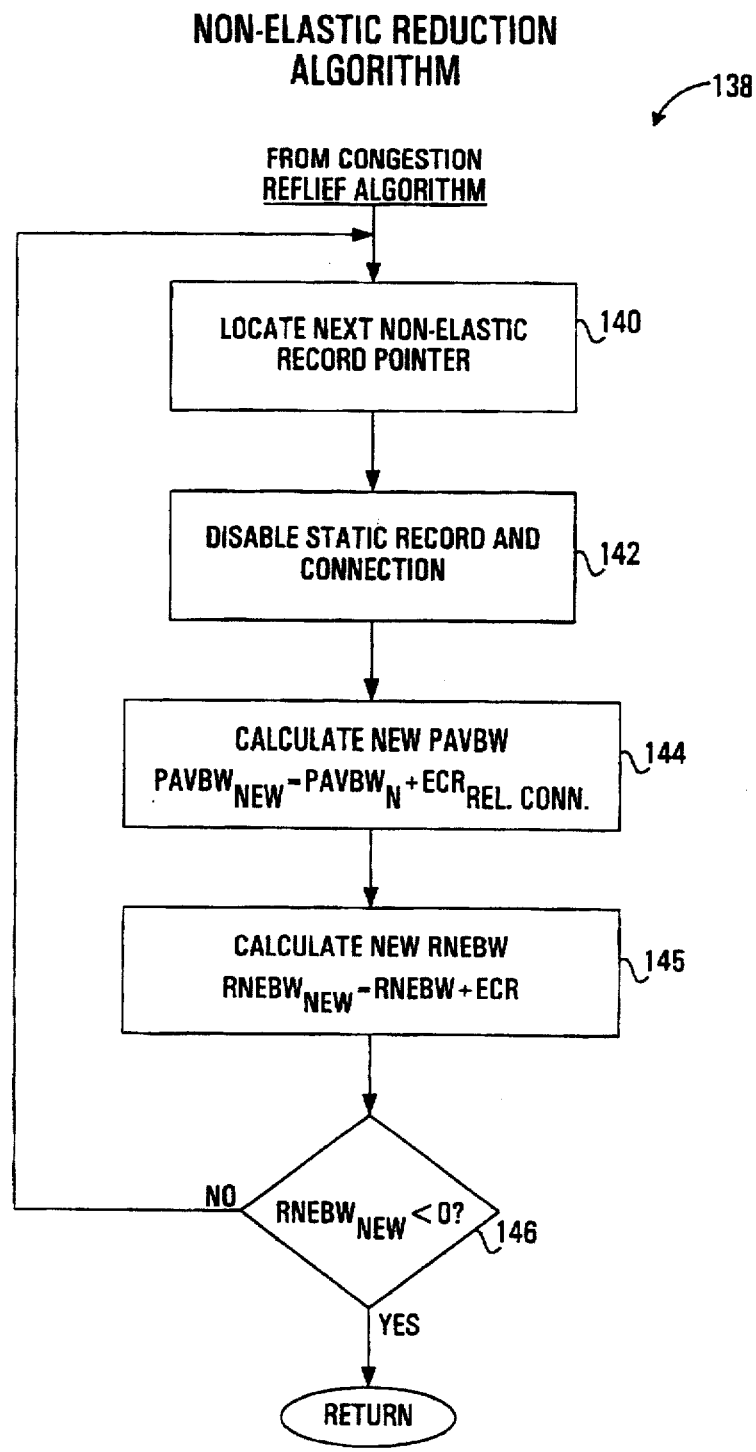
Figure 10B:
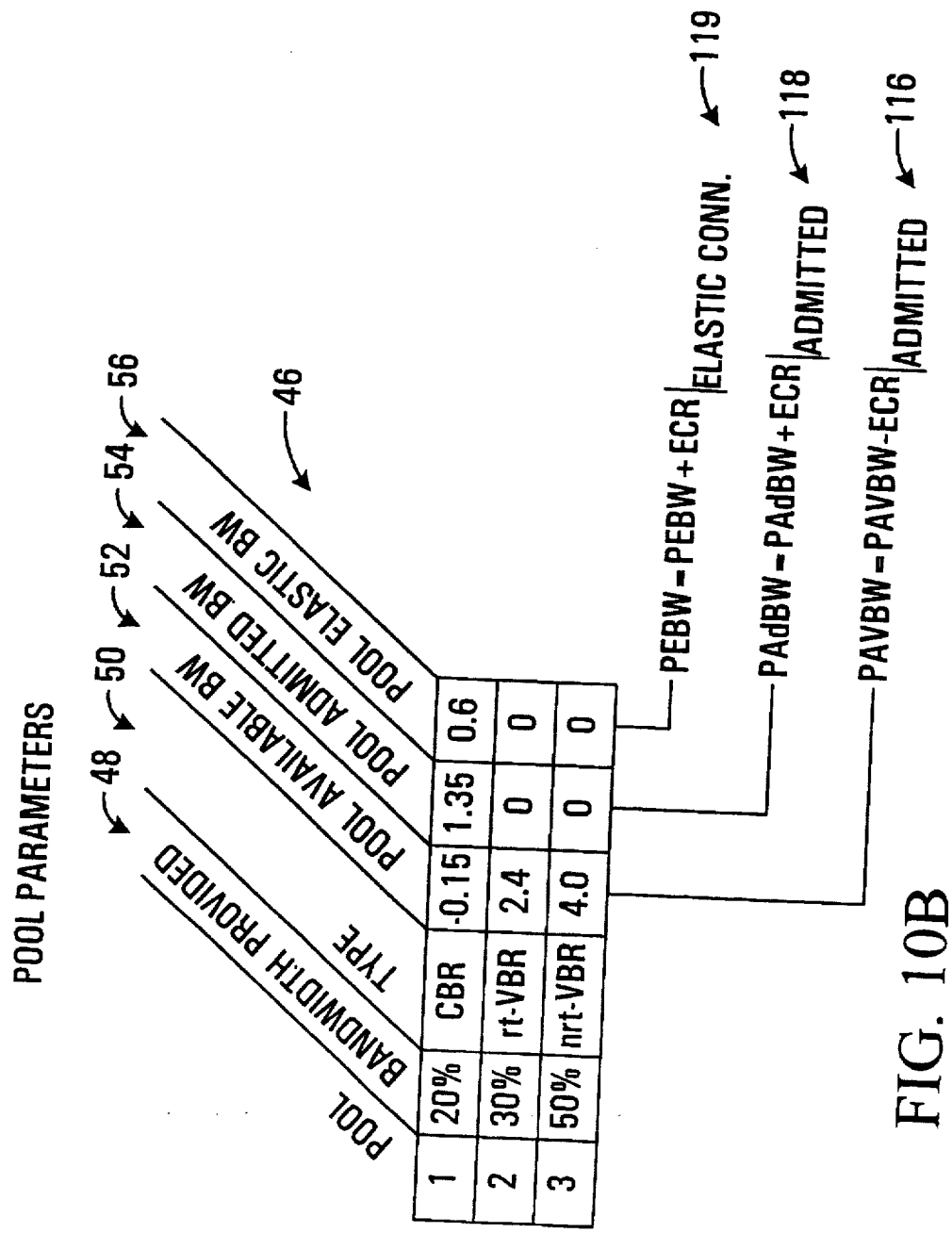
Figure 13:
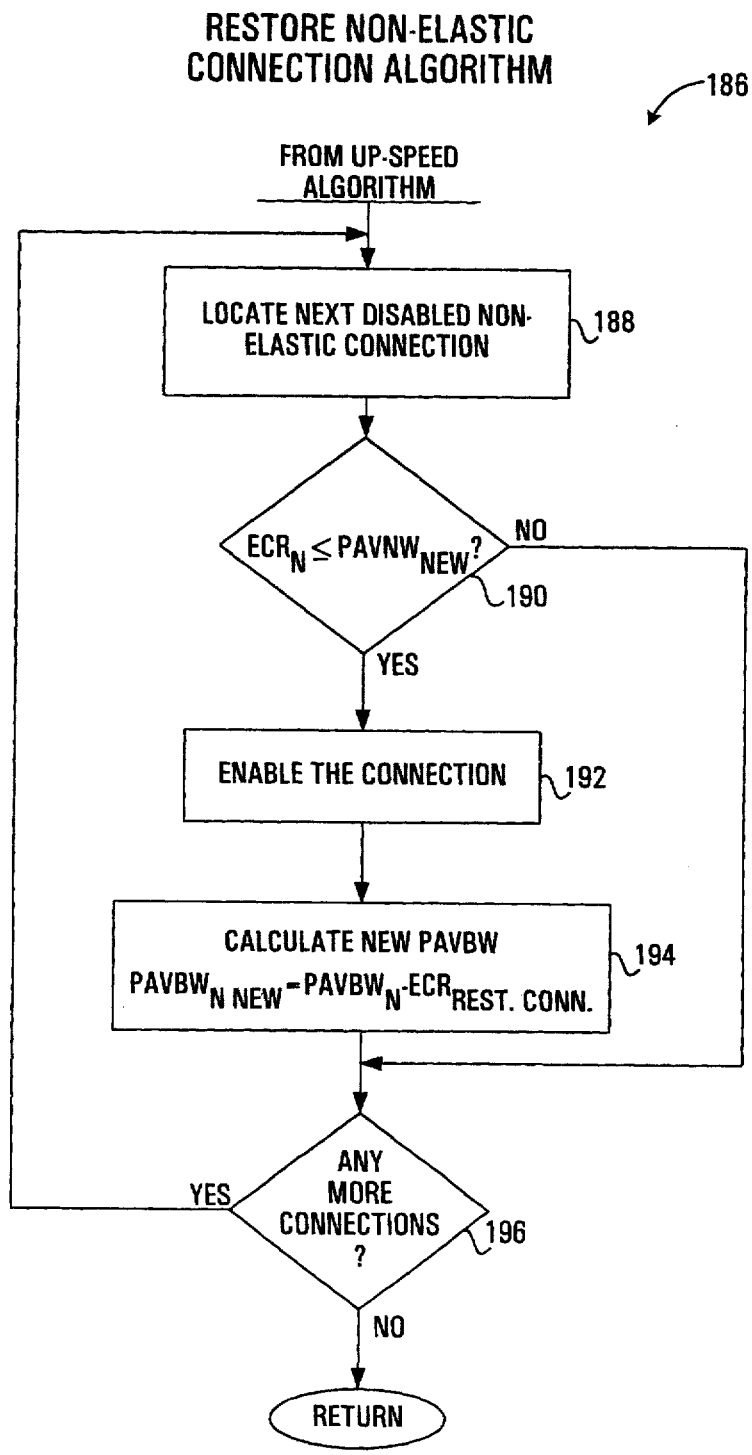

Restore Non-Elastic Connection Algorithm
FIG. 13

Referring to FIG. 13, the restore non-elastic connections algorithm is shown generally at 186. This algorithm begins with block 188 which directs the IMAFP processor 22 to locate the next pointer of a non-elastic connection record in the CBC tree, having a disable code in the enable/disable field 96. Referring to FIG. 5, in this embodiment, pointer A is located. Referring to FIG. 5, pointer A is associated with record 82.

Referring back to FIG. 13, block 190 directs the processor to determine whether the pool available bandwidth is sufficient to allow the connection associated with record 82 to be enabled, and if not, to locate the pointer of the next non-elastic connection record. If the connection associated with record 82 can be re-enabled, block 192 directs the processor to set the contents of the enable/disable field 96 of record 82 to enable, in order to re-enable the connection associated with the record.

Block 194 then directs the processor to calculate a new pool available bandwidth value according to the relation:

PAvBW[n new] = PAvBW[n] − ECR[restored connection]
where: PAvBW[n new]   is the new pool available bandwidth;
PAvBW[n]   is the pool available bandwidth before the connection is restored; and
ECR[released connection]   is equivalent cell rate of the restored connection.

Block 196 directs the processor to determine if there are any more non-elastic connections, and if so processing continues with blocks 188 through 196 to re-establish at least some non-elastic connections until all non-elastic connections have been considered by the algorithm. Then the restore non-elastic connections algorithm is completed and processing returns to the up-speed algorithm shown in FIG. 11.

While specific embodiments of the invention have been described and illustrated, such embodiments should be considered illustrative of the invention only and not as limiting the invention as construed in accordance with the accompanying claims.

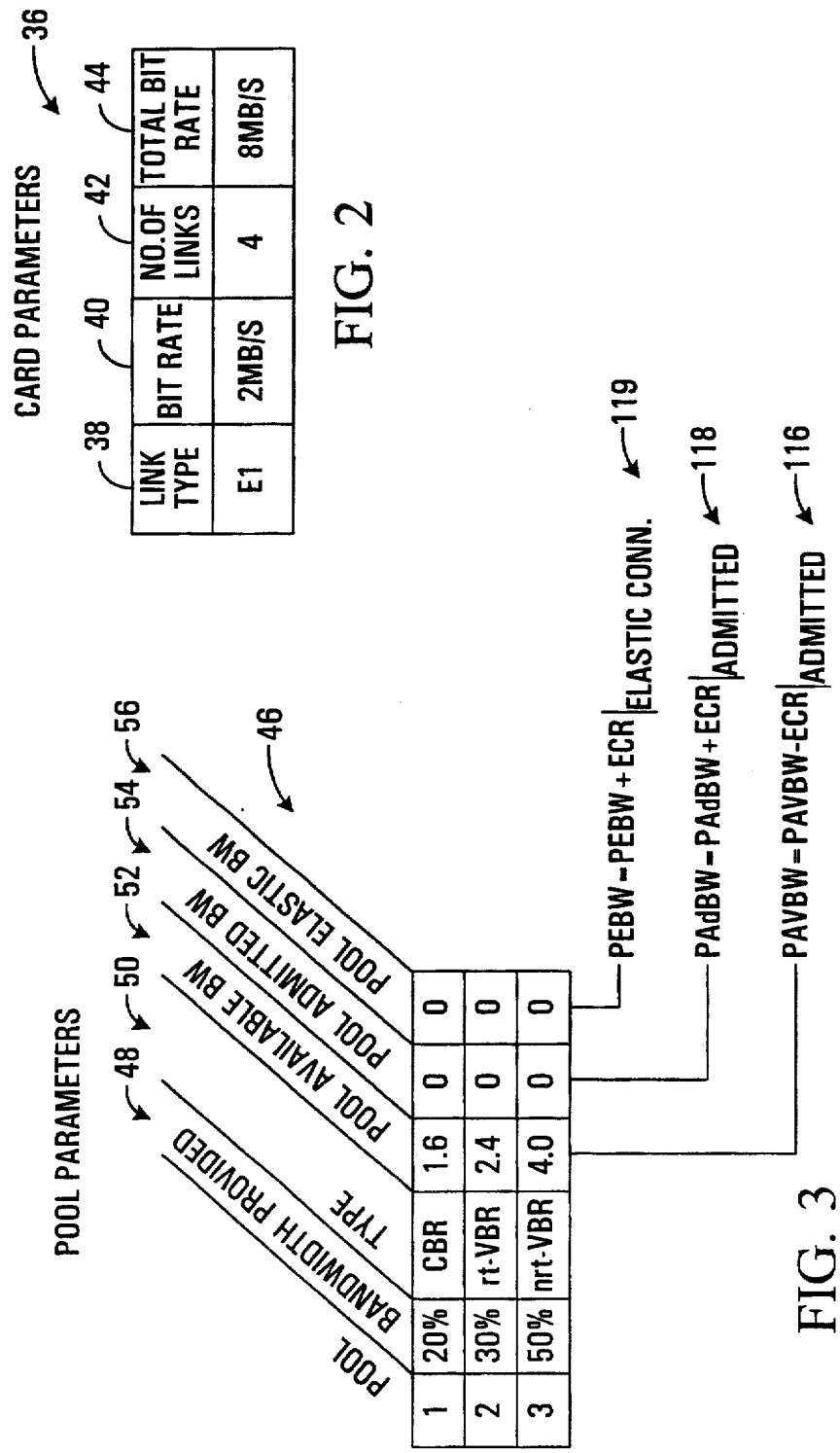

What is claimed is:

1. A method of reducing bandwidth loading by a bandwidth reduction amount in a communications interface having elastic and non-elastic call connections, said elastic and non-elastic call connections having associated current cell rates and equivalent cell rates respectively, the method comprising:

a) reducing the current cell rate of each elastic connection; and b) releasing at least some non-elastic connections,
said current cell rate of each elastic connection being reduced and said non-elastic connections being released until the total of the current cell rates of said elastic connections and equivalent cell rates of said non-elastic connections has been reduced by at least said bandwidth reduction amount.

2. A method as claimed in claim 1 further comprising associating a release priority with each of said non-elastic connections and releasing said non-elastic connections according to said release priority.

3. A method as claimed in claim 2 wherein associating a release priority comprises prioritizing call connection records associated with respective said connections, said call connection records having at least one connection attribute field, said connection records being prioritized according to said at least one connection attribute field.

4. A method as claimed in claim 3 wherein prioritizing comprises prioritizing call connection records having attribute fields including an enable/disable field, an ATM service category field, a bandwidth elastic field, a holding priority field, a connection type field, a vpi.vci field and a cell rate field, by applying the contents of each of said attribute fields to a hashing function to produce a first set of sorting indices for connection records associated with elastic connections and a second set of sorting indices for connection records associated with non-elastic connections.

5. A method as claimed in claim 4 further comprising producing a first sorting index for connection records having a first group of attribute fields with common entries.

6. A method as claimed in claim 5 further comprising producing a linked list of pointers to connection records associated with said first sorting index.

7. A method as claimed in claim 5 further comprising producing at least a second sorting index associated with connection records having a group of attribute fields with common entries, said group being a sub group of said first group.

8. A method as claimed in claim 7 further comprising producing at least a second linked list of pointers to connection records associated with said second sorting index.

9. A method as claimed in claim 8 further comprising releasing connections according to the order of said linked list associated with connection records associated with said first sorting index.

10. A method as claimed in claim 9 further comprising associating a disable code with released connection records.

11. A method as claimed in claim 10 further comprising placing said disable code in said enable/disable field.

12. A method as claimed in claim 1 further comprising identifying each of said non-elastic connections as static or dynamic and releasing at least some non-elastic connections identified as dynamic before releasing said non-elastic connections identified as static.

13. A method as claimed in claim 1 further comprising
    a) producing an elastic bandwidth loss value and a non elastic bandwidth loss value representing respective complementary proportions of said bandwidth reduction amount;
    b) reducing the current cell rate of each elastic connection by an amount equal to the product of the elastic bandwidth loss value and the ratio of the current cell rate of said each respective elastic connection to the sum of the current cell rates of all of said elastic connections; and
    c) releasing at least some non-elastic connections until the sum of the equivalent cell rates of each released non-elastic connection is at least approximately equal to said non-elastic bandwidth loss value.

14. A method as claimed in claim 13 further comprising associating a release priority with each of said non-elastic connections and releasing said non-elastic connections according to said release priority.

15. A method as claimed in claim 14 further comprising identifying each of said non-elastic connections as static or dynamic and releasing at least some non-elastic connections identified as dynamic before releasing said non-elastic connections identified as static.

16. A method of changing bandwidth loading by a bandwidth change amount in a communications interface having elastic and non-elastic call connections, said elastic and non-elastic call connections having associated current cell rates and equivalent cell rates respectively, the method comprising:
    a) determining whether said bandwidth change amount is negative or positive;
    b) when said bandwidth change amount is negative;
        i) reducing the current cell rate of each elastic connection; and
        ii) releasing at least some non-elastic connections. said current cell rate of each elastic connection being reduced and said non-elastic connections being released until the total of the current cell rate of said elastic connections and the equivalent cell rates of said non-elastic connections have been reduced by at least said bandwidth change amount; and
    c) when said bandwidth change amount is positive:
        i) increasing the current cell rate of each elastic connection.

17. A method as claimed in claim 16 further comprising re-establishing at least some non-elastic connections.

18. A method as claimed in claim 17 further comprising associating a release priority with each of said non-elastic connections.

19. A method as claimed in claim 18 further comprising releasing said non-elastic connections according to said release priority, when said bandwidth change amount is negative.

20. A method as claimed in claim 18 wherein associating a release priority comprises prioritizing call connection records associated with respective said connections, said call connection records having at least one connection attribute field, said connection records being prioritized according to said at least one connection attribute field.

21. A method as claimed in claim 20 wherein prioritizing comprises prioritizing call connection records having attribute fields including an enable/disable field, an ATM service category field, a bandwidth elastic field, a holding priority field, a connection type field, a vpi.vci field and a cell rate field, by applying the contents of each of said attribute fields to a hashing function to produce a first set of sorting indices for connection records associated with elastic connections and a second set of sorting indices for connection records associated with non-elastic connections.

22. A method as claimed in claim 21 further comprising producing a first sorting index for connection records having a first group of attribute fields with common entries.

23. A method as claimed in claim 22 further comprising producing a linked list of pointers to connection records associated with said first sorting index.

24. A method as claimed in claim 22 further comprising producing at least a second sorting index associated with connection records having a group of attribute fields with common entries, said group being a sub group of said first group.

25. A method as claimed in claim 24 further comprising producing at least a second linked list of pointers to connection records associated with said second sorting index.

26. A method as claimed in claim 25 further comprising releasing connections according to the order of said linked list associated with connection records associated with said first sorting index.

27. A method as claimed in claim 26 further comprising associating a disable code with released connection records.

28. A method as claimed in claim 27 further comprising placing said disable code in said enable/disable field.

29. A method as claimed in claim 17 further comprising identifying each of said non-elastic connections as static or dynamic and releasing at least some non-elastic connections identified as dynamic before releasing said non-elastic connections identified as static.

30. A method as claimed in claim 17 further comprising
   a) producing an elastic bandwidth loss value and a non elastic bandwidth loss value representing respective complementary proportions of said bandwidth change amount;
   b) reducing the current cell rate of each elastic connection by an amount equal to the product of the elastic bandwidth loss value and the ratio of the current cell rate of said each respective elastic connection to the sum of the current cell rates of all of said elastic connections; and
   c) releasing at least some non-elastic connections until the sum of the equivalent cell rates of each released non-elastic connection is at least approximately equal to said non-elastic bandwidth loss value.

31. A method as claimed in claim 30 further comprising associating a release priority with each of said non-elastic connections.

32. A method as claimed in claim 31 further comprising releasing said non-elastic connections according to an ascending order of said release priority.

33. A method as claimed in claim 31 further comprising re-establishing said non-elastic connections according to a descending order of said release priority.

34. A method as claimed in claim 31 further comprising identifying each of said non-elastic connections as static or dynamic and releasing at least some non-elastic connections identified as dynamic before releasing said non-elastic connections identified as static.

35. A method as claimed in claim 31 further comprising re-establishing said non-elastic connections identified as static before re-establishing said non-elastic connections identified as dynamic.

36. A method as claimed in claim 25 wherein re-establishing said non-elastic connections comprises re-establishing said non-elastic connections according to descending order of said indices and descending order of said link lists associated with said indices.

37. A method of increasing bandwidth loading by a bandwidth change amount in a communications interface having elastic all connections and disabled non-elastic all connections, said elastic and non-elastic call connections having associated current cell rates and equivalent cell rates respectively, the method comprising:
   a) increasing the current cell rate of each elastic connection; and
   b) re-establishing at least some disabled non-elastic connections,
   said current cell rate of each elastic connection being increased and said non-elastic connections being re-established until the total of the current cell rates of said elastic connections and of equivalent cell rates of non-disabled non-elastic connections has been increased by at least said bandwidth change amount.
   a) increasing the current cell rate of each elastic connection; and
   b) re-establishing at least some disabled non-elastic connections.

38. A method as claimed in claim 37 further comprising associating a release priority with each of said disabled non-elastic connections.

39. A method as claimed in claim 38 further comprising re-establishing said disabled non-elastic connections according to a descending order of said release priority.

40. A method as claimed in claim 38 wherein associating a release priority comprises prioritizing call connection records associated with respective said connections, said call connection records having at least one connection attribute field, said connection records being prioritized according to said at least one connection attribute field.

41. A method as claimed in claim 40 wherein prioritizing comprises prioritizing call connection records having attribute fields including an enable/disable field, an ATM service category field, a bandwidth elastic field, a holding priority field, a connection type field, a vpi.vci field and a cell rate field, by applying the contents of each of said attribute fields to a hashing function to produce a first set of sorting indices for connection records associated with elastic connections and a second set of sorting indices for connection records associated with said disabled non-elastic connections.

42. A method as claimed in claim 41 further comprising producing a first sorting index for connection records having a first group of attribute fields with common entries.

43. A method as claimed in claim 42 further comprising producing a linked list of pointers to connection records associated with said first sorting index.

44. A method as claimed in claim 42 further comprising producing at least a second sorting index associated with connection records having a group of attribute fields with common entries, said group being a sub-group of said first group.

45. A method as claimed in claim 44 further comprising producing at least a second linked list of pointers to connection records associated with said second sorting index.

46. A method as claimed in claim 45 further comprising re establishing connections according to a descending order of said linked list associated with connection records associated with said second sorting index.

47. A method as claimed in claim 37 further comprising identifying each of said disabled non-elastic connections as static or dynamic and re-establishing leasing at least some disabled non-elastic connections identified as static before re-establishing said disabled non-elastic connections identified as dynamic.

48. A method as claimed in claim 37 further comprising
   a) increasing the current cell rate of each elastic connection by an amount equal to the minimum of an initial current cell rate and product of the bandwidth change amount and the ratio of the initial current cell rate of said each respective elastic connection to the sum of the initial current cell rates of all of said elastic connections; and
   b) if the bandwidth change amount is greater than the sum of the initial current cell rates of all elastic connections, re-establishing at least some disabled non-elastic connections until the sum of the equivalent cell rates of each released disabled non-elastic connection is at least approximately equal to an amount by which the bandwidth change amount exceeds the sum of the initial current cell rates of all of said elastic connections.

49. A method as claimed in claim 48 further comprising associating a release priority with each of said disabled non-elastic connections.

50. A method as claimed in claim 49 further comprising re-establishing said disabled non-elastic connections according to a descending order of said release priority.

51. A method as claimed in claim 49 further comprising identifying each of said disabled non-elastic connections as static or dynamic and re-establishing at least some disabled non-elastic connections identified as static before re-establishing disabled non-elastic connections identified as dynamic.

52. A method as claimed in claim 45 wherein re-establishing said disabled non-elastic connections includes comprises re-establishing said disabled non-elastic connections according to descending order of said indices and descending order of said link lists associated with said indices.

53. An apparatus for reducing bandwidth loading by a bandwidth reduction amount in a communications interface having elastic and non-elastic call connections, said elastic and non-elastic call connections having associated current cell rates and equivalent cell rates respectively, the apparatus comprising:
a processor programmed to:
  a) reduce the current cell rate of each elastic connection; and
  b) release at least some non-elastic connections, said current cell rate of each elastic connection being reduced and said non-elastic connections being released until the total of the current cell rates of said elastic connections and equivalent cell rates of said non-elastic connections have been reduced by at least said bandwidth reduction amount.

54. An apparatus as claimed in claim 53 wherein said processor is programmed to associate a release priority with each of said non-elastic connections and to release said non-elastic connections according to said release priority.

55. An apparatus as claimed in claim 54 wherein said processor is programmed to prioritize call connection records associated with respective said connections, said call connection records having at least one connection attribute field, said connection records being prioritized according to said at least one connection attribute field.

56. An apparatus as claimed in claim 55 wherein said processor is programmed to prioritize call connection records having attribute fields including an enable/disable field, an ATM service category field, a bandwidth elastic field, a holding priority field, a connection type field, a vpi.vci field and a cell rate field, by applying the contents of each of said attribute fields to a hashing function to produce a first set of sorting indices for connection records associated with elastic connections and a second set of sorting indices for connection records associated with non-elastic connections.

57. An apparatus as claimed in claim 56 wherein said processor is programmed to produce a first sorting index for connection records having a first group of attribute fields with common entries.

58. An apparatus as claimed in claim 57 wherein said processor is programmed to produce a linked list of pointers to connection records associated with said first sorting index.

59. An apparatus as claimed in claim 57 wherein said processor is programmed to produce at least a second sorting index associated with connection records having a group of attribute fields with common entries.

60. An apparatus as claimed in claim 59 wherein said processor is programmed to produce at least a second linked list of pointers to connection records associated with said second sorting index.

61. An apparatus as claimed in claim 60 wherein said processor is programmed to release connections according to the order of said linked list associated with connection records associated with said first sorting index.

62. An apparatus as claimed in claim 62 wherein said processor is programmed to associate a disable code with released connection records.

63. An apparatus as claimed in claim 62 wherein said processor is programmed to place said disable code in said enable/disable field.

64. An apparatus as claimed in claim 53 wherein said processor is programmed to identify each of said non-elastic connections as static or dynamic and release at least some non-elastic connections identified as dynamic before releasing said non-elastic connections identified as static.

65. An apparatus as claimed in claim 53 wherein said processor is programmed to:
  a) produce an elastic bandwidth loss value and a non elastic bandwidth loss value representing respective complementary proportions of said bandwidth reduction amount;
  b) reduce the current cell rate of each elastic connection by an amount equal to the product of the elastic bandwidth loss value and the ratio of the current cell rate of said each respective elastic connection to the sum of the current cell rates of all of said elastic connections; and
  c) release at least some non-elastic connections until the sum of the equivalent cell rates of each released non-elastic connection is at least approximately equal to said non-elastic bandwidth loss value.

66. An apparatus as claimed in claim 65 wherein said processor is programmed to associate a release priority with each of said non-elastic connections and release said non-elastic connections according to said release priority.

67. An apparatus as claimed in claim 66 wherein said processor is programmed to identify each of said non-elastic connections as static or dynamic and release at least some non-elastic connections identified as dynamic before releasing said non-elastic connections identified as static.

68. An apparatus for changing bandwidth loading by a bandwidth change amount in a communications interface having elastic and non-elastic call connections, said elastic and non-elastic call connections having associated current cell rates and equivalent cell rates respectively, the apparatus comprising:
a processor programmed to:
  a) determine whether said bandwidth change amount is negative or positive;
  b) when said bandwidth change amount is negative:
    i) reduce the current cell rate of each elastic connection; and
    ii) release at least some non-elastic connections, said current cell rate of each elastic connection being reduced and said non-elastic connections being released until the total of the current cell rates of said elastic connections and the equivalent cell rates of said non-elastic connections has been reduced by at least said bandwidth change amount; and
  c) when said bandwidth change amount is positive:
    i) increase the current cell rate of each elastic connection.

69. An apparatus as claimed in claim 68 wherein said processor is programmed to re-establish at least some non elastic connections.

70. An apparatus as claimed in claim 69 wherein said processor is programmed to associate a release priority with each of said non-elastic connections.

71. An apparatus as claimed in claim 70 wherein said processor is programmed to release said non-elastic connections according to said release priority, when said bandwidth change amount is negative.

72. An apparatus as claimed in claim 70 wherein said processor is programmed to prioritize call connection records associated with respective said connections, said call connection records having at least one connection attribute field, said connection records being prioritized according to said at least one connection attribute field.

73. An apparatus as claimed in claim 72 wherein said processor is programmed to prioritize call connection records having attribute fields including an enable/disable field, an ATM service category field, a bandwidth elastic field, a holding priority field, a connection type field, a vpi.vci field and a cell rate field, by applying the contents of each of said attribute fields to a hashing function to produce a first set of sorting indices for connection records associated with elastic connections and a second set of sorting indices for connection records associated with non-elastic connections.

74. An apparatus as claimed in claim 73 wherein said processor is programmed to produce a first sorting index for connection records having a first group of attribute fields with common entries.

75. An apparatus as claimed in claim 74 wherein said processor is programmed to produce a linked list of pointers to connection records associated with said first sorting index.

76. An apparatus as claimed in claim 74 wherein said processor is programmed to produce at least a second sorting index associated with connection records having a group of attribute fields with common entries, said group being a sub group of said first group.

77. An apparatus as claimed in claim 76 wherein said processor is programmed to produce at least a second linked list of pointers to connection records associated with said second sorting index.

78. An apparatus as claimed in claim 77 wherein said processor is programmed to release connections according to the order of said linked list associated with connection records associated with said first sorting index.

79. An apparatus as claimed in claim 78 wherein said processor is programmed to associate a disable code with released connection records.

80. An apparatus as claimed in claim 79 wherein said processor is programmed to place said disable code in said enable/disable field.

81. An apparatus as claimed in claim 69 wherein said processor is programmed to identify each of said non-elastic connections as static or dynamic and release at least some non-elastic connections identified as dynamic before releasing said non-elastic connections identified as static.

82. An apparatus as claimed in claim 69 wherein said processor is programmed to:
 a) produce an elastic bandwidth loss value and a non elastic bandwidth loss value representing respective complementary proportions of said bandwidth change amount;
 b) reduce the current cell rate of each elastic connection by an amount equal to the product of the elastic bandwidth loss value and the ratio of the current cell rate of said each respective elastic connection to the sum of the current cell rates of all of said elastic connections; and
 c) release at least some non-elastic connections until the sum of the equivalent cell rates of each released non-elastic connection is at least approximately equal to said non-elastic bandwidth loss value.

83. An apparatus as claimed in claim 82 wherein said processor is programmed to associate a release priority with each of said non-elastic connections.

84. An apparatus as claimed in claim 83 wherein said processor is programmed to release said non-elastic connections according to an ascending order of said release priority.

85. An apparatus as claimed in claim 83 wherein said processor is programmed to re-establish said non-elastic connections according to a descending order of said release priority.

86. An apparatus as claimed in claim 83 wherein said processor is programmed to identify each of said non-elastic connections as static or dynamic and release at least some non-elastic connections identified as dynamic before releasing said non-elastic connections identified as static.

87. An apparatus as claimed in claim 83 wherein said processor is programmed to re-establish said non-elastic connections identified as static before re-establishing said non-elastic connections identified as dynamic.

88. An apparatus as claimed in claim 77 wherein said processor is programmed to re-establish said non-elastic connections according to descending order of said indices and descending order of said link lists associated with said indices.

89. An apparatus for increasing bandwidth loading by a bandwidth change amount in a communications interface having elastic call connections and disabled non-elastic call connections, said elastic call connections having associated current cell rates, the apparatus comprising:
 a processor programmed to:
 a) increase the current cell rate of each elastic connection; and
 b) re-establish at least some disabled non-elastic connections,
 said current cell rate of each elastic connection being increased and said non-elastic connections being re-established until the total of the current cell rates of said elastic connections and of equivalent cell rates of non-disabled non-elastic connections has been increased by at least said bandwidth change amount.

90. An apparatus as claimed in claim 89 wherein said processor is programmed to associate a release priority with each of said disabled non-elastic connections.

91. An apparatus as claimed in claim 90 wherein said processor is programmed to re-establish said disabled non-elastic connections according to a descending order of said release priority.

92. An apparatus as claimed in claim 90 wherein said processor is programmed to prioritize call connection records associated with respective said connections, said call connection records having at least one connection attribute field, said connection records being prioritized according to said at least one connection attribute field.

93. An apparatus as claimed in claim 92 wherein said processor is programmed to prioritize call connection records having attribute fields including an enable/disable field, an ATM service category field, a bandwidth elastic field, a holding priority field, a connection type field, a vpi.vci field and a cell rate field, by applying the contents of each of said attribute fields to a hashing function to produce a first set of sorting indices for connection records associated with elastic connections and a second set of sorting indices for connection records associated with said disabled non-elastic connections.

94. An apparatus as claimed in claim 93 wherein said processor is programmed to produce a first sorting index for connection records having a first group of attribute fields with common entries.

95. An apparatus as claimed in claim 94 wherein said processor is programmed to produce a linked list of pointers to connection records associated with said first sorting index.

96. An apparatus as claimed in claim 94 wherein said processor is programmed to produce at least a second sorting index associated with connection records having a group of attribute fields with common entries.

97. An apparatus as claimed in claim 96 wherein said processor is programmed to produce at least a second linked list of pointers to connection records associated with said second sorting index.

98. An apparatus as claimed in claim 97 wherein said processor is programmed to re establish connections according to a descending order of said linked list associated with connection records associated with said second sorting index.

99. An apparatus as claimed in claim 89 wherein said processor is programmed to identify each of said disabled non-elastic connections as static or dynamic and re-establishing leasing at least some disabled non-elastic connections identified as static before re-establishing said disabled non-elastic connections identified as dynamic.

100. An apparatus as claimed in claim 89 wherein said processor is programmed to:
   a) increase the current cell rate of each elastic connection by an amount equal to the minimum of an initial current cell rate and product of the bandwidth change amount and the ratio of the initial current cell rate of said each respective elastic connection to the sum of the initial current cell rates of all of said elastic connections; and
   b) if the bandwidth change amount is greater than the sum of the initial current cell rates of all elastic connections, re-establish at least some disabled non-elastic connections until the sum of the equivalent cell rates of each released disabled non-elastic connection is at least approximately equal to an amount by which the bandwidth change amount exceeds the sum of the initial current cell rates of all of said elastic connections.

101. An apparatus as claimed in claim 100 wherein said processor is programmed to associate a release priority with each of said disabled non-elastic connections.

102. An apparatus as claimed in claim 101 wherein said processor is programmed to re-establish said disabled non-elastic connections according to a descending order of said release priority.

103. An apparatus as claimed in claim 101 wherein said processor is programmed to identify each of said disabled non-elastic connections as static or dynamic and re-establishing at least some disabled non-elastic connections identified as static before re-establishing disabled non-elastic connections identified as dynamic.

104. An apparatus as claimed in claim 97 wherein said processor is programmed to re-establish said disabled non-elastic connections includes said processor is programmed to re-establish said disabled non-elastic connections according to descending order of said indices and descending order of said link lists associated with said indices.

105. A method of admitting call connections having known bandwidths on a plurality of communications links providing a total communications bandwidth, the method comprising:
   a) assigning pool available bandwidth values representing respective portions of said total communications bandwidth to respective bandwidth pools associated with respective call connection service categories;
   b) admitting call connections on said plurality of communications links and associating admitted call connections with bandwidth pools associated with respective call connection service categories identified by respective said admitted call connections;
   c) maintaining a measure of a pool admitted bandwidth representing the bandwidth occupied by said admitted call connections, said pool admitted bandwidth being the cumulative sum of said known bandwidth of said admitted call connections; and
   d) preventing the admission of a further call connection when the known bandwidth of said further call connection added to the pool admitted bandwidth of the pool with which said further call would be associated exceeds the bandwidth provided, of said pool which said further call would be associated.

106. A method as claimed in claim 105 further comprising maintaining a measure of pool elastic bandwidth representing the bandwidth occupied by admitted elastic call connections, said pool elastic bandwidth being the cumulative sum of said known bandwidth of admitted elastic call connections.

107. A method as claimed in claim 106 further comprising associating with each pool a record having a plurality of fields for storing pool parameters identifying characteristics of said each pool.

108. A method as claimed in claim 107 wherein said records comprises:
   a) a bandwidth provided field for storing a bandwidth provided value representing the percentage of said total communications bandwidth associated with the pool represented by said record;
   b) a pool available bandwidth field for storing said pool available bandwidth value, said pool available bandwidth value being calculated as the product of said bandwidth provided value and said total communications bandwidth of said communications links;
   c) a pool admitted bandwidth field for storing said pool admitted bandwidth value; and
   d) a pool elastic bandwidth field for storing said pool elastic bandwidth value.

* * * * *

UNITED STATES PATENT AND TRADEMARK OFFICE
CERTIFICATE OF CORRECTION

PATENT NO.    : 6,128,280
DATED         : October 3, 2000
INVENTOR(S)   : Bilel Nouri Jamoussi et al.

It is certified that error appears in the above-identified patent and that said Letters Patent is hereby corrected as shown below:

Figure 3,
Reference 48, delete "banwidth" and substitute -- bandwidth -- therefor;
Reference 52, delete "avaibable" and substitute -- available -- therefor;
Reference 119, delete "eleastic" and substitute -- elastic -- therefor;

Figure 6A,
Reference 48, delete "banwidth" and substitute -- bandwidth -- therefor;
Reference 52, delete "avaibable" and substitute -- available -- therefor;
Reference 119, delete "eleastic" and substitute -- elastic -- therefor;

Figure 9,
In the text above and preceeding block 140, delete "reflief" and substitute -- relief -- therefor;

Figure 10B,
Reference 48, delete "banwidth" and substitute -- bandwidth -- therefor;
Reference 52, delete "avaibable" and substitute -- available -- therefor;
Reference 119, delete "eleastic" and substitute -- elastic -- therefor;

Figure 13,
Delete Reference numeral "140" and substitute -- 188 -- therefor;

Column 18,
Lines 1-4, delete "a) increasing the current cell rate of each elastic connection; and b) re-establishing at least some disabled non-elastic connections."

Column 20,
Line 9, delete "62" and substitute -- 61 -- therefor;

UNITED STATES PATENT AND TRADEMARK OFFICE
CERTIFICATE OF CORRECTION

PATENT NO. : 6,128,280
DATED : October 3, 2000
INVENTOR(S) : Bilel Nouri Jamoussi et al.

It is certified that error appears in the above-identified patent and that said Letters Patent is hereby corrected as shown below:

Column 24,
Line 32, between "pool" and "which", insert -- with --.

Signed and Sealed this

Twenty-ninth Day of January, 2002

Attest:

JAMES E. ROGAN
Attesting Officer
Director of the United States Patent and Trademark Office